(12) United States Patent
Abe

(10) Patent No.: US 11,223,062 B2
(45) Date of Patent: Jan. 11, 2022

(54) STACK HOLDING APPARATUS

(71) Applicant: TOYOTA JIDOSHA KABUSHIKI KAISHA, Toyota (JP)

(72) Inventor: Nobuhira Abe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 16/936,505

(22) Filed: Jul. 23, 2020

(65) Prior Publication Data
US 2021/0057775 A1 Feb. 25, 2021

(30) Foreign Application Priority Data

Aug. 23, 2019 (JP) .............................. JP2019-153021

(51) Int. Cl.
*H01M 10/04* (2006.01)
(52) U.S. Cl.
CPC ... *H01M 10/0468* (2013.01); *H01M 10/0404* (2013.01)
(58) Field of Classification Search
CPC ........... H01M 10/0468; H01M 10/0404; Y02P 70/50
See application file for complete search history.

(56) References Cited

U.S. PATENT DOCUMENTS

| 10,011,103 B2 * | 7/2018 | Oiwa ...................... B32B 37/10 |
| 2019/0123376 A1 | 4/2019 | Ando et al. |
| 2020/0044273 A1 | 2/2020 | Abe |

FOREIGN PATENT DOCUMENTS

| JP | H04037153 U | 3/1992 |
| JP | H11-045739 A | 2/1999 |
| JP | 2010113997 A | 5/2010 |
| JP | 2017185675 A | 10/2017 |
| JP | 2019215977 A | 12/2019 |
| JP | 2020024816 A | 2/2020 |
| JP | 2020138854 A | 9/2020 |

* cited by examiner

*Primary Examiner* — Maria Laios
*Assistant Examiner* — Bartholomew A Hornsby
(74) *Attorney, Agent, or Firm* — Dickinson Wright, PLLC

(57) ABSTRACT

A stack holding apparatus comprising a stacking platform on which sheet members are stacked, a pressing mechanism constantly pressing the stacking platform toward an upper side in the stacking direction of the sheet members stacked on the stacking platform, a pair of clamp rods arranged in parallel with a front-back direction of the stacking platform so as to face the two left and right sides of the stacking platform, clamp arms fixed to the clamp rods and clamping the sheet members stacked on the stacking platform from an upper side in the stacking direction, slide mechanisms making the clamp rods move parallel to the stacking direction, and tilt mechanisms making the clamp rods tilt so that the clamp arms open to an upper side in the stacking direction while moving away from the stacking platform and further so that the clamp arms approach the stacking platform while closing to the lower side in the stacking direction.

6 Claims, 17 Drawing Sheets

CONVEYANCE DIRECTION

STACK HOLDING APPARATUS

FIELD

The present disclosure relates to a stack holding apparatus.

BACKGROUND

Japanese Unexamined Patent Publication No. 2017-185675 discloses a conventional stack holding apparatus configured to support side surfaces of a stack by guide members.

SUMMARY

However, if, as shown in the above-mentioned Patent Publication, supporting side surfaces of a stack by guide members, when stacking the sheet members, the sheet members strike the guide members and the peripheral edge parts of the sheet members are liable to be damaged.

The present disclosure was made focusing on such a problem and has as its object to keep sheet members from being damaged when stacking the sheet members.

To solve the above problem, the stack holding apparatus according to one aspect of the present disclosure comprises a stacking platform on which sheet members are stacked, a pressing mechanism constantly pressing the stacking platform toward an upper side in the stacking direction of the sheet members stacked on the stacking platform, a pair of clamp rods arranged in parallel with a front-back direction of the stacking platform so as to face the two left and right sides of the stacking platform, clamp arms fixed to the clamp rods and clamping the sheet members stacked on the stacking platform from an upper side in the stacking direction, slide mechanisms making the clamp rods move parallel to the stacking direction, and tilt mechanisms making the clamp arms tilt so that the clamp arms open to an upper side in the stacking direction while moving away from the stacking platform and further so that the clamp arms approach the stacking platform while closing to the lower side in the stacking direction.

According to this aspect of the present disclosure, when opening the clamp arms and releasing the clamping action of the sheet members by the clamp arms, the tilt mechanisms are used to make the clamp arms open to the upper side in the stacking direction while moving away from the stacking platform, so the surfaces of the peripheral edge parts of the sheet members can be kept from being rubbed against by the clamp arms and the peripheral edge parts of the sheet members can be kept from ending up being damaged. Further, when closing the clamp arms and clamping the sheet members by the clamp arms, the slide mechanisms are used to make the once raised clamp rods descend to thereby clamp the sheet members by the clamp arms from the upper side in the stacking direction. For this reason, even when using the clamp arms to clamp the sheet members, the surfaces of the sheet member at the peripheral edge parts will never be rubbed against by the clamp arms, so it is possible to keep the peripheral edge parts of the sheet members from ending up being damaged.

DESCRIPTION OF EMBODIMENTS

The present disclosure relates to a stack manufacturing apparatus of sheet-shaped electrodes. From a stack of such sheet-shaped electrodes, for example a battery mounted in a vehicle is formed. Therefore, first, to start, a sheet-shaped electrode forming this stack will be explained.

Figure 1A:
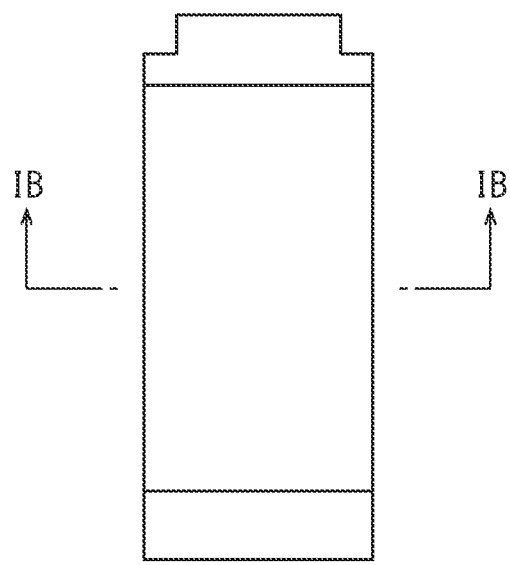
FIG. 1A is a plan view of a unit cell according to one embodiment of the present disclosure.
Figure 1B:
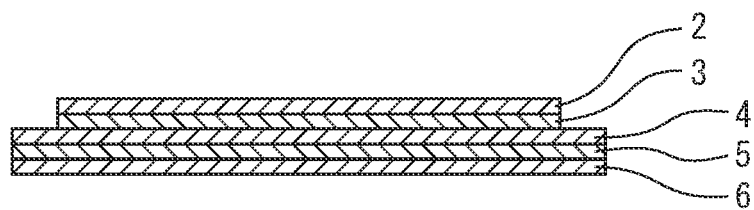
FIG. 1B is a cross-sectional view of a unit cell according to one embodiment of the present disclosure.

FIG. 1A and FIG. 1B respectively schematically show a plan view of a component of a cell manufactured using this sheet-shaped electrode, that is, a unit cell, and a cross-sectional view of a unit cell seen along the line IB-IB of FIG. 1A. Note that, the thickness of a unit cell is 1 mm or less. Therefore, in FIG. 1B, the thicknesses of the layers are shown considerably exaggerated.

Figure 2:
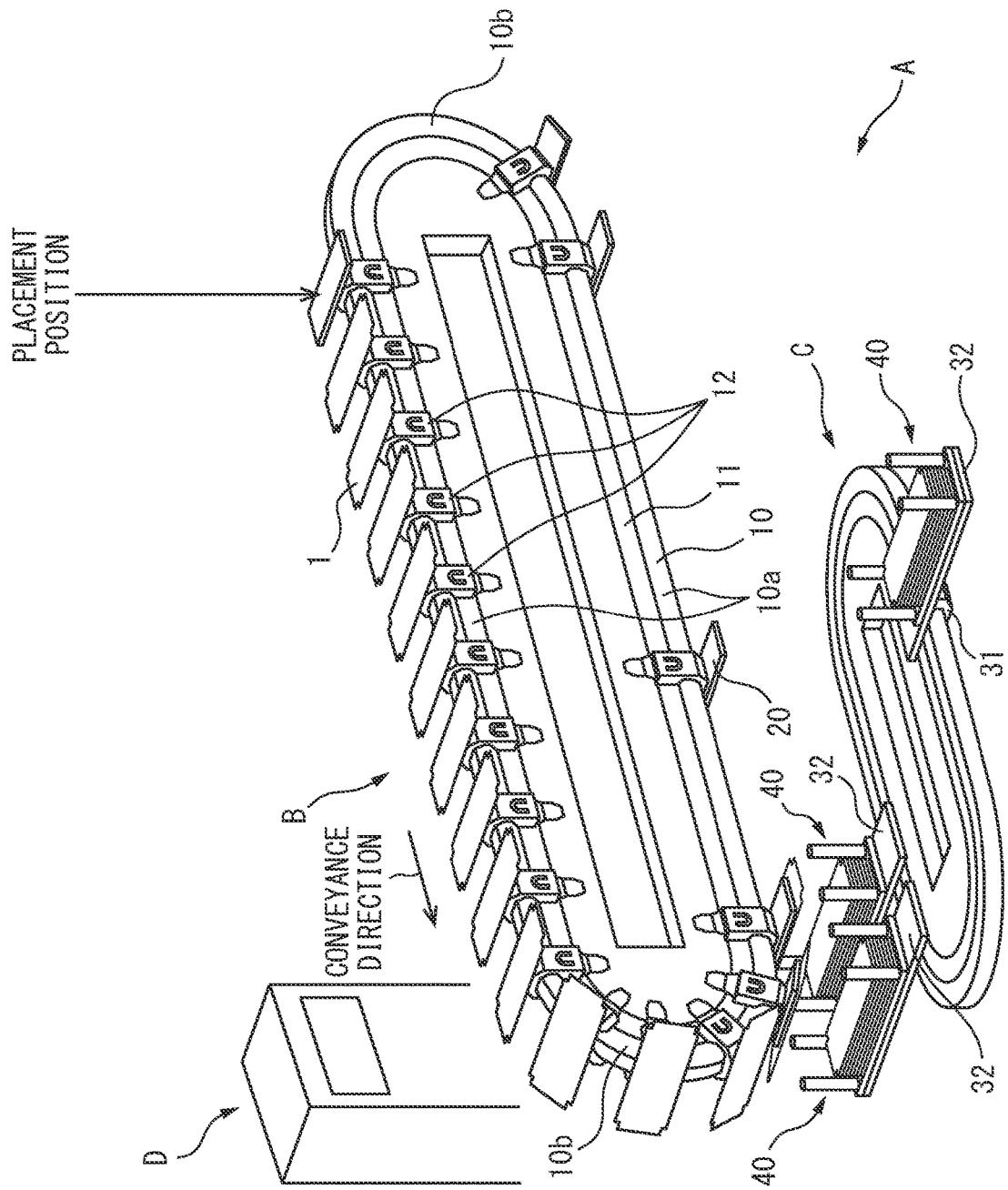
FIG. 2 is a perspective view of a stack manufacturing apparatus according to one embodiment of the present disclosure for manufacturing a stack including a sheet-shaped electrode.

Referring to FIG. 1B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The positive electrode current collector layer 2 is formed from a conductive material. In the present embodiment, this positive electrode current collector layer 2 is formed from metal foil for current collection use, for example, aluminum foil. Further, the positive electrode active material layer 3 is formed from a positive electrode active material able to store lithium ions, sodium ions, calcium ions, and other metal ions at the time of discharge and release them at the time of charging. Further, the solid electrolyte layer 4 is formed from a material having conductivity with respect to lithium ions, sodium ions, calcium ions, and other metal ions and able to be utilized as a material for an all solid battery.

On the other hand, the negative electrode active material layer 5 is formed from a negative electrode active material able to release lithium ions, sodium ions, calcium ions, and other metal ions at the time of discharge and store them at the time of charging. Further, the negative electrode current collector layer 6 is formed from a conductive material. In the present embodiment, this negative electrode current collector layer 6 is formed from a current collection use metal foil, for example, copper foil. Further, as will be understood from the above-mentioned explanation, a battery manufactured in the present embodiment is an all solid battery. In this case, this battery is preferably an all solid lithium rechargeable battery.

Figure 1C:
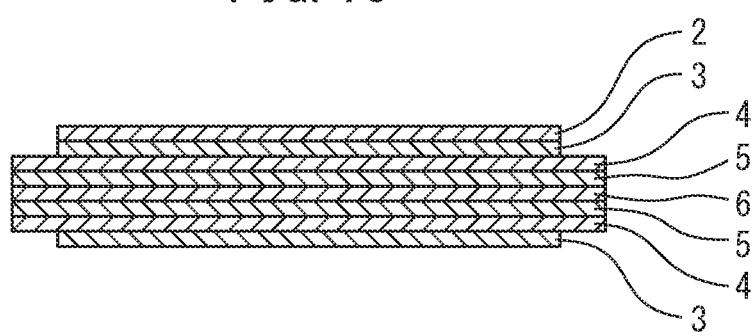
FIG. 1C is a cross-sectional view of a sheet-shaped electrode with a positive electrode according to one embodiment of the present disclosure.
Figure 1D:
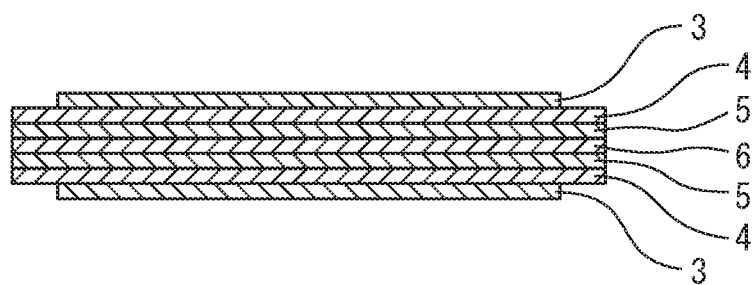
FIG. 1D is a cross-sectional view of a sheet-shaped electrode without a positive electrode according to one embodiment of the present disclosure.

Now then, the sheet-shaped electrode used in the present embodiment has a rectangular plan shape similar to FIG. 1A and has a cross-sectional structure shown in FIG. 1C or FIG. 1D. These FIG. 1C and FIG. 1D show cross-sectional views at positions similar to the line IB-IB of FIG. 1A. Note that, in these FIG. 1C and FIG. 1D as well, in the same way as FIG. 1B, 2 indicates a positive electrode current collector layer, 3 indicates a positive electrode active material layer, 4 indicates a solid electrolyte layer, 5 indicates a negative electrode active material layer, and 6 indicates a negative electrode current collector layer.

The sheet-shaped electrode shown in FIG. 1C has the negative electrode current collector layer 6 positioned at its center part. In the upward direction from this negative electrode current collector layer 6, a negative electrode active material layer 5, solid electrolyte layer 4, positive electrode active material layer 3, and positive electrode current collector layer 2 are successively formed. In the downward direction from the negative electrode current collector layer 6, a negative electrode active material layer 5, solid electrolyte layer 4, and positive electrode active material layer 3 are successively formed. In this case, in the present embodiment, the negative electrode current collector layers 6 are formed from copper foil, while the positive electrode current collector layers 2 are formed from aluminum foil.

On the other hand, the sheet-shaped electrode shown in FIG. 1D has a negative electrode current collector layer 6 positioned at its center part. From each of the upward direction and downward direction from this negative electrode current collector layer 6, a negative electrode active material layer 5, solid electrolyte layer 4, and positive electrode active material layer 3 are successively formed. That is, the sheet-shaped electrode shown in FIG. 1D does not have the positive electrode current collector layer 2. In the case shown in FIG. 1D as well, the negative electrode current collector layer 6 is formed from copper foil. In the present embodiment, a sheet-shaped electrode of a cross-sectional shape shown in FIG. 1D is formed in advance. As explained later, in the middle of the stacking process, aluminum foil (positive electrode current collector) 2 is bonded to the sheet-shaped electrode of the cross-sectional shape shown in FIG. 1D. As a result, the sheet-shaped electrode of the cross-sectional shape shown in FIG. 1C, that is, the sheet-shaped electrode with aluminum foil 2 bonded to it, is formed.

In the present embodiment, the sheet-shaped electrode to which this aluminum foil 2 is bonded is called the "sheet-shaped electrode 1". Note that, in the following explanation, if not considered particularly confusing, the sheet-shaped electrode of the cross-sectional shape shown in FIG. 1D to which no aluminum foil 2 is bonded will also be called a "sheet-shaped electrode 1". As opposed to this, if it is desirable to express differentiated the sheet-shaped electrode 1 to which aluminum foil 2 is bonded and the sheet-shaped electrode 1 to which aluminum foil 2 is not bonded, the sheet-shaped electrode to which aluminum foil 2 is bonded will be called a "sheet-shaped electrode 1 with a positive electrode", while the sheet-shaped electrode to which aluminum foil 2 is not bonded will be referred to as a "sheet-shaped electrode 1 without a positive electrode".

Note that, the sheet-shaped electrodes 1 shown in FIG. 1C and FIG. 1D show single illustrations. Use of various structures of sheet-shaped electrodes 1 may be considered. For example, on one surface of the copper foil 6, it is possible to form a negative electrode active material layer 5, solid electrolyte layer 4, positive electrode active material layer 3, and positive electrode current collector layer 2, to form a negative electrode active material layer 5, solid electrolyte layer 4, and positive electrode active material layer 3, to form a negative electrode active material layer 5 and solid electrolyte layer 4, or to form only a negative electrode active material layer 5, while on the other surface of the copper foil 6, it is possible to form a negative electrode active material layer 5 and solid electrolyte layer 4 or form only a negative electrode active material layer 5 or to not form anything. Further, instead of the copper foil 6, it is possible to use the aluminum foil for forming the positive electrode current collector layer 2 and form on one surface of this aluminum foil 2 a positive electrode active material layer 3, solid electrolyte layer 4, negative electrode active material layer 5, and negative electrode current collector layer 6, to form a positive electrode active material layer 3, solid electrolyte layer 4, and negative electrode active material layer 5, to form a positive electrode active material layer 3 and solid electrolyte layer 4, or to form only a positive electrode active material layer 3 and possible to form on the other surface a positive electrode active material layer 3, solid electrolyte layer 4, and negative electrode active material layer 5, to form a positive electrode active material layer 3 and solid electrolyte layer 4, to form only a positive electrode active material layer 3, or to not form anything at all in the structure.

Therefore, if expressing this comprehensively, in the present disclosure, the sheet-shaped electrode 1 includes metal foil 2 or 6 for current collection use and at least one of a positive electrode active material layer 3 and negative electrode active material layer 5 formed on the metal foil 2 or 6 for current collection use. Note that, below, embodiments of the present disclosure will be explained taking as an example the case of the sheet-shaped electrode 1 having a structure shown in any of FIG. 1C and FIG. 1D.

FIG. 2 is a perspective view of a stack manufacturing apparatus A according to the present embodiment for manufacturing a stack including a sheet-shaped electrode 1.

As shown in FIG. 2, the stack manufacturing apparatus A is provided with an electrode conveyance device B, jig conveyance device C, and operation control device D.

At the electrode conveyance device B, a sheet-shaped electrode 1 without a positive electrode is moved to the placement position shown by the arrow mark in FIG. 2. The sheet-shaped electrode 1 without a positive electrode moved to the electrode conveyance device B is conveyed by the electrode conveyance device B in the conveyance direction shown in FIG. 2 so as to form a stack including this sheet-shaped electrode 1 without a positive electrode.

Below, first, while referring to FIG. 3 to FIG. 6B in addition to FIG. 2, details of this electrode conveyance device B will be explained.

Figure 3:
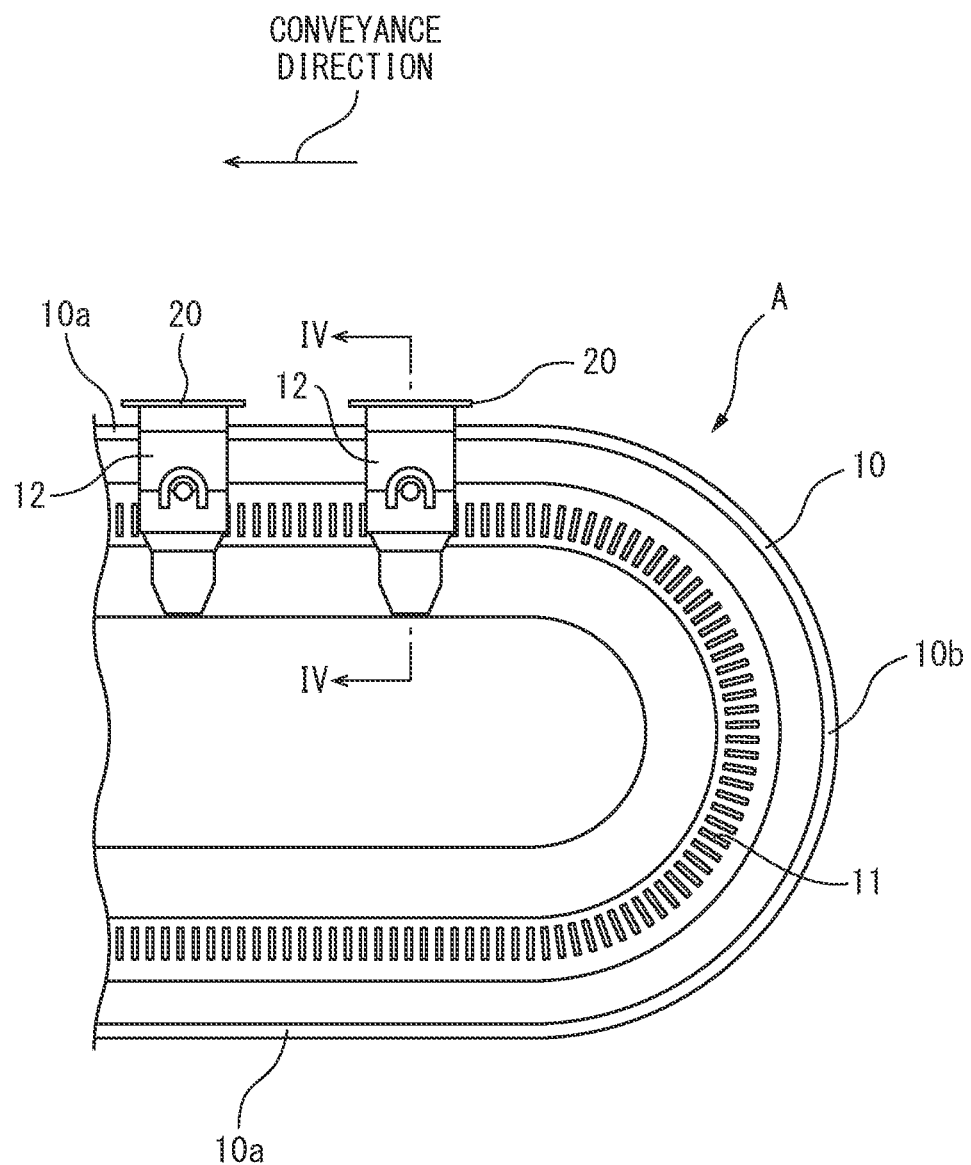
FIG. 3 is an enlarged side view of part of an electrode conveyance device according to one embodiment of the present disclosure.

FIG. 3 is an enlarged side view of part of the electrode conveyance device B.

As shown in FIG. 2 and FIG. 3, the electrode conveyance device B is provided with an elliptical shaped rail 10 comprised of horizontal straight parts 10*a* spaced apart from each other in the vertical direction in a vertical plane and a pair of semicircular parts 10*b* and a plurality of movers 12 able to move on this rail 10.

Figure 4:
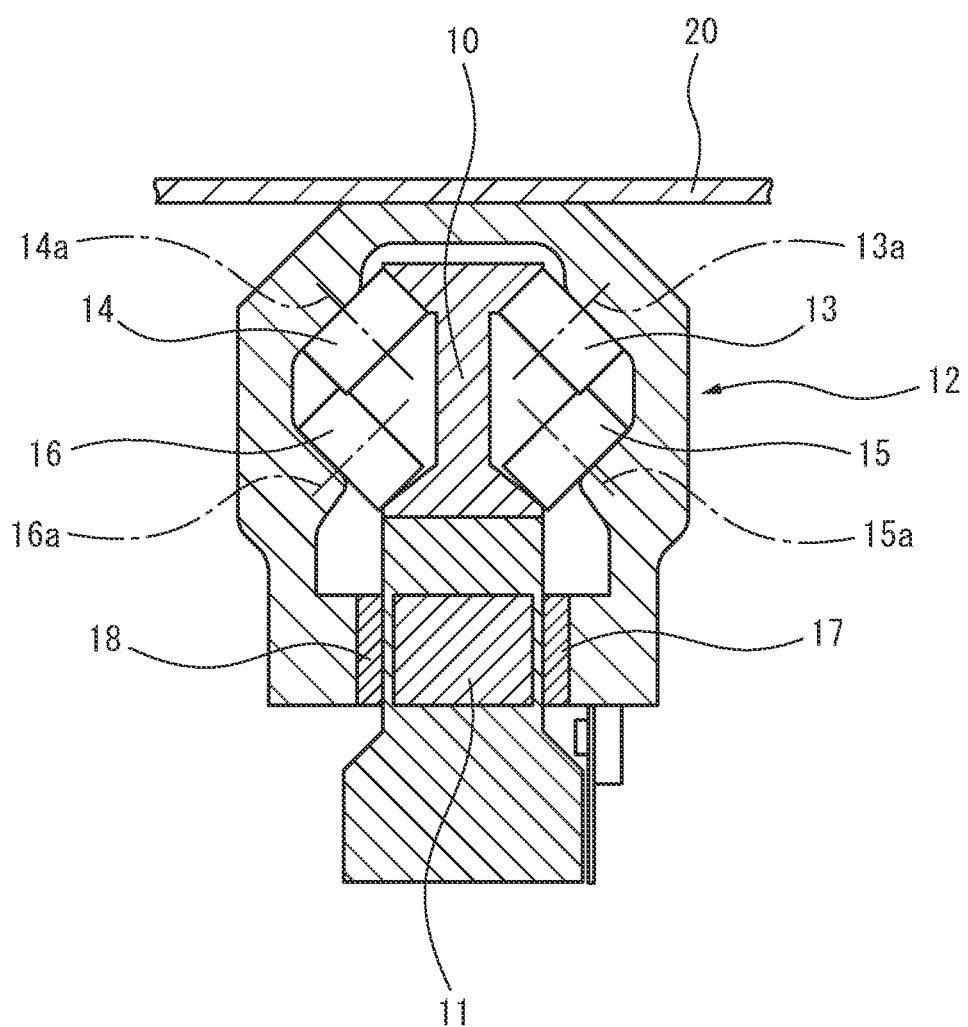
FIG. 4 is a cross-sectional view of a mover according to one embodiment of the present disclosure seen along a line IV-IV of FIG. 3.

FIG. 4 is a cross-sectional view of a mover 12 along the line IV-IV of FIG. 3.

As shown in FIG. 4, this mover 12 is provided with a pair of guide rollers 13 attached to the mover 12 to be able to rotate about axes 13*a* and roll on the rail 10 (arranged at the front and rear in the direction of advance), a pair of guide rollers 14 attached to the mover 12 to be able to rotate about axes 14*a* and roll on the rail 10 (arranged at the front and rear in the direction of advance), a guide roller 15 attached to the mover 12 to be able to rotate about an axis 15*a* and roll on the rail 10, and a guide roller 16 attached to the mover 12 to be able to rotate about an axis 16*a* and roll on the rail 10.

Further, the mover 12 is provided with a pair of permanent magnets 17 and 18. Inside of the electrode conveyance device B sandwiched between these permanent magnets 17 and 18, a stator 11 around which a coil is wound is arranged. This stator 11 and the permanent magnets 17 and 18, that is, the stator 11 and mover 12, form a linear motor. Therefore, in the electrode conveyance device B, the mover 12 of a linear motor is made to move on the rail 10. Each mover 12 of the electrode conveyance device B is, for example, numbered. Each mover 12 is respectively independently controlled in speed of movement and position etc. for each mover 12 by the operation control device D.

Further, on the mover 12, a rectangular shaped conveyor plate 20 is attached. On this conveyor plate 20, a sheet-shaped electrode 1 is placed.

Figure 5:
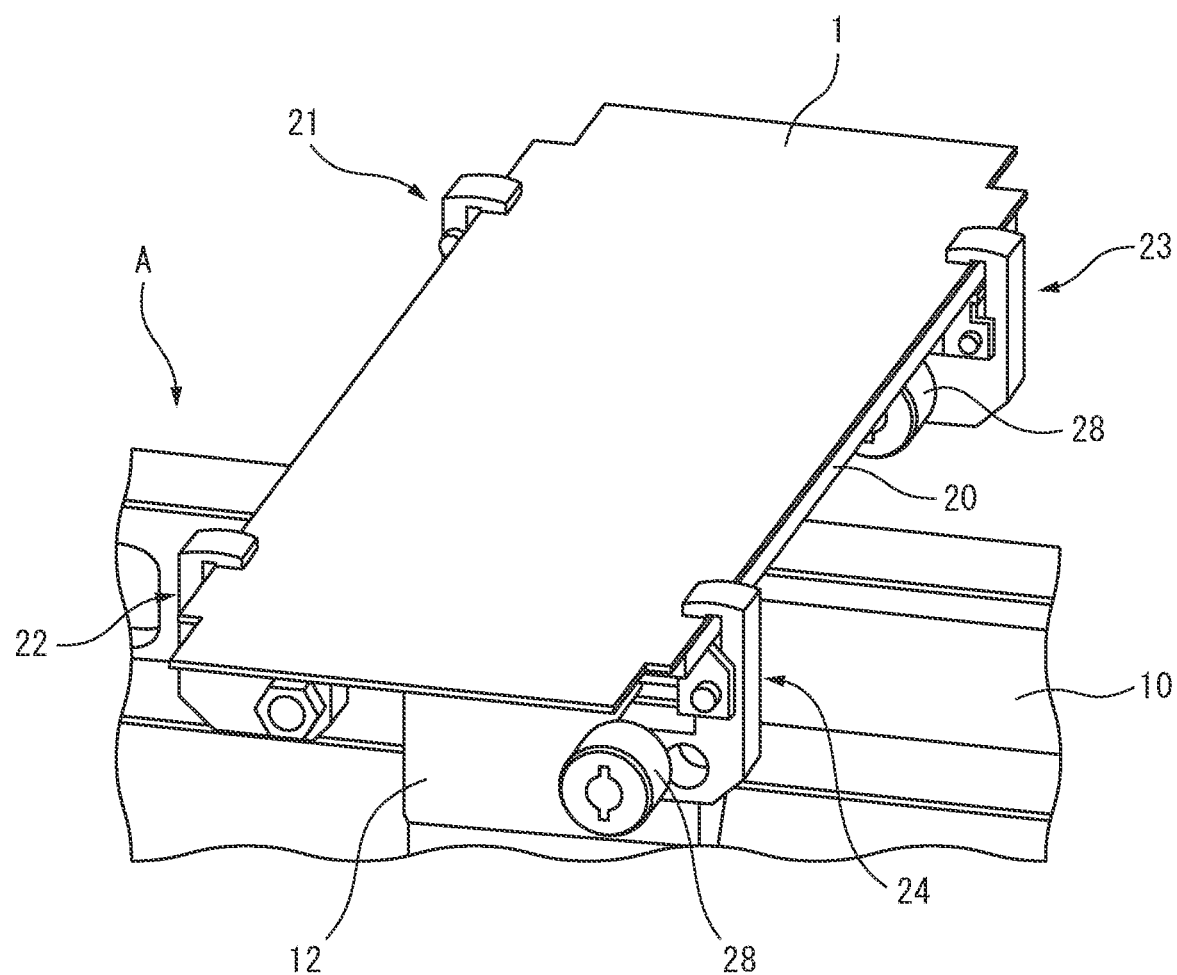
FIG. 5 is a perspective view of a conveyor plate according to one embodiment of the present disclosure attached to a mover.

FIG. 5 is a perspective view of the conveyor plate 20 attached to the mover 12.

As shown in FIG. 5, the conveyor plate 20 has a plurality of clamps 21, 22, 23, and 24 attached for clamping the sheet-shaped electrode 1 carried on the conveyor plate 20 against the conveyor plate 20 and holding the sheet-shaped electrode 1 at the placement position of the conveyor plate 20 during conveyance. In the present embodiment, a pair of clamps 21 and 22 are attached spaced apart from each other at the front end part of the conveyor plate 20 positioned at the front in the conveyance direction while a pair of clamps 23 and 24 are attached spaced apart from each other at the rear end part of the conveyor plate 20 positioned at the rear in the direction of advance.

These clamps 21, 22, 23, and 24 have the same structure. Therefore, the clamp 22 will be used as an example to explain the structure of the clamps.

Figure 6A:
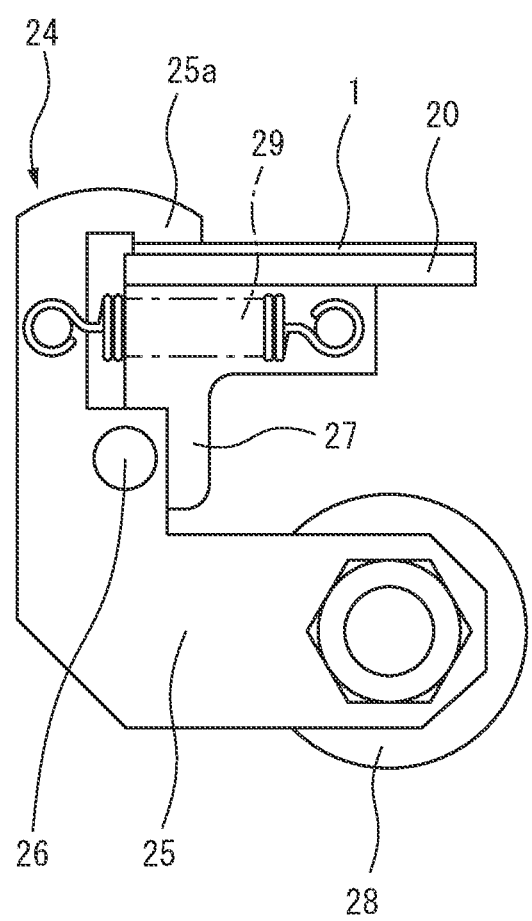
FIG. 6A is a view for explaining operation of a clamp of a conveyor plate.
Figure 6B:
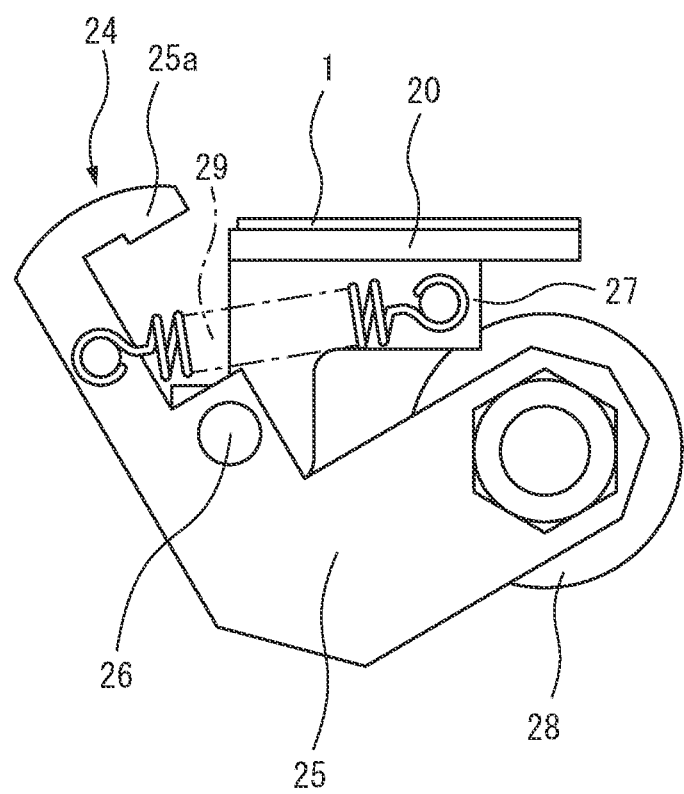
FIG. 6B is a view for explaining operation of a clamp of a conveyor plate.

FIG. 6A shows the time when the sheet-shaped electrode 1 is clamped against the conveyor plate 20 by the clamp 22, while FIG. 6B shows the time when the clamp 22 releases the sheet-shaped electrode 1.

As shown in FIG. 6A and FIG. 6B, the clamp 22 is provided with a clamp arm 25 forming a roughly speaking L-shape. The center part of this clamp arm 25 is attached by a support pin 26 to a support plate 27 fastened to the conveyor plate 20 to be able to rotate. One end of the clamp arm 25 is formed with a clamping part 25*a* extending to over the surface of the conveyor plate 20. The other end of the clamp arm 25 has a roller 28 attached to it. The clamp arm 25 is constantly biased clockwise by a tension spring 29 attached between the clamp arm 25 and support plate 27.

On the moving route of the mover 12, a fixed cam (not shown) able to engage with the roller 28 of the clamp arm 25 is provided. The roller 28 of the clamp arm 25 normally does not engage with this fixed cam. At this time, as shown in FIG. 6A, the sheet-shaped electrode 1 is clamped against the conveyor plate 20 by the clamping part 25*a* of the clamp arm 25 due to the spring force of the tension spring 29. On the other hand, if the roller 28 of the clamp arm 25 engages with the fixed cam, as shown in FIG. 6B, the roller 28 will rise and the sheet-shaped electrode 1 will be released from the clamping part 25*a* of the clamp arm 25. Note that, as will be understood from FIG. 6A, there is a gap between the clamp arm 25 and the outer peripheral edges of the sheet-shaped electrodes 1. Therefore, the outer peripheral edges of the sheet-shaped electrodes 1 do not contact the clamp arm 25. That is, at this time, the entire outer peripheral edges of the sheet-shaped electrodes 1 are in a noncontact state. Therefore, when sheet-shaped electrodes 1 are clamped on the conveyor plate 20 by the clamping part 25*a* of the clamp arm 25, the outer peripheral edges of the sheet-shaped electrodes 1 are never damaged.

Next, referring to FIG. 7, the process of stacking a sheet-shaped electrode 1 will be explained.

Figure 7:
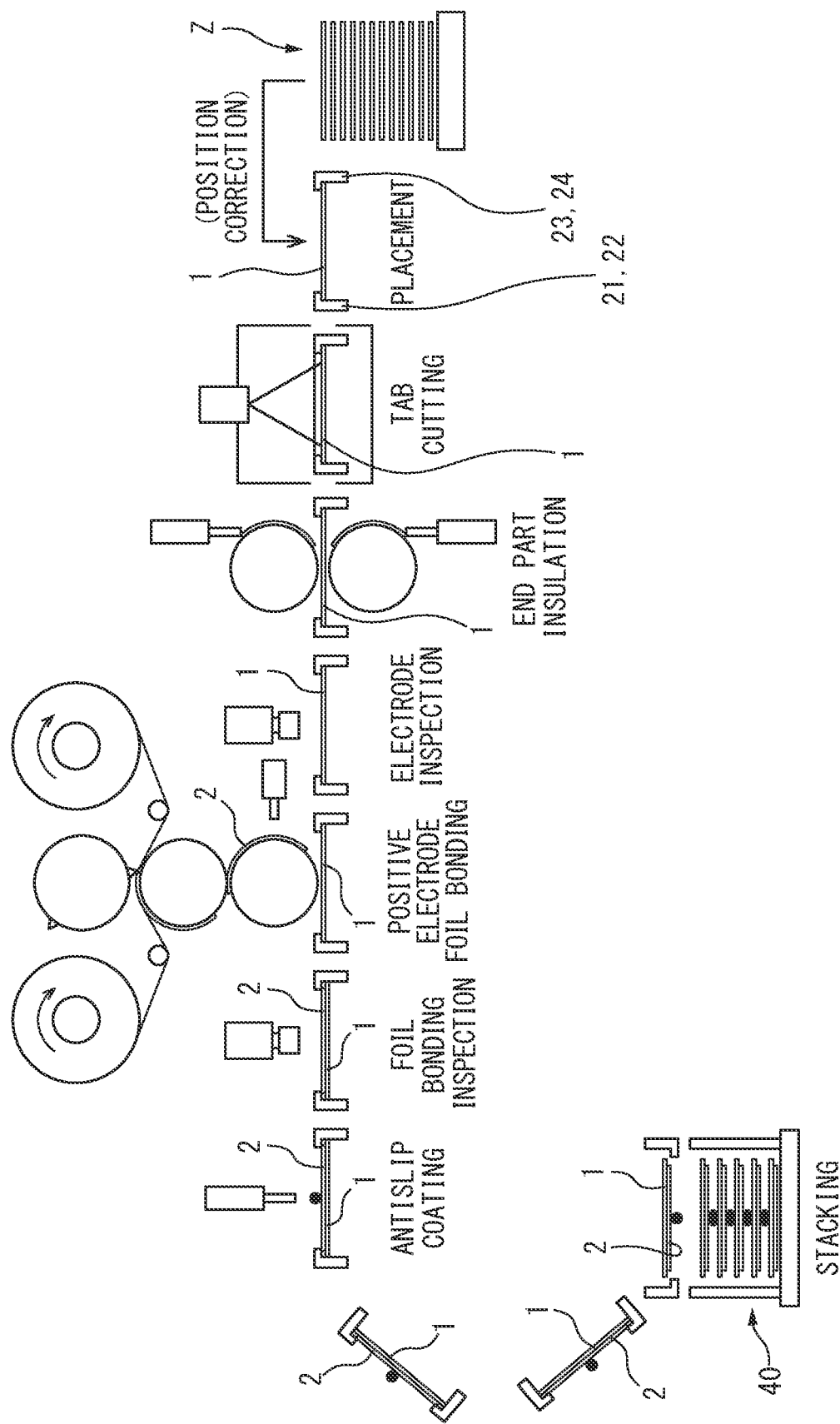
FIG. 7 is a view showing a stacking process of a sheet-shaped electrode.

FIG. 7 schematically shows this process of stacking sheet-shaped electrode 1. This FIG. 7 schematically shows sheet-shaped electrodes 1 carried on conveyor plates 20 and clamps 21, 22, 23, and 24 attached to the conveyor plates 20. However, in FIG. 7, the conveyor plates 20 are omitted. Note that, this FIG. 7 shows various processings performed when sheet-shaped electrodes 1 are conveyed by the electrode conveyance device B.

In the present embodiment, the two surfaces of a long narrow copper foil are successively coated at intervals in the longitudinal direction of the copper foil with negative electrode active material layers, solid electrolyte layers, and positive electrode active material layers so as to be superposed on each other, then this copper foil is cut into predetermined lengths to thereby prepare sheet-shaped electrodes 1 without positive electrodes with the cross-sectional shapes shown in FIG. 1D. These sheet-shaped electrodes 1 without positive electrodes are stored stacked in a magazine Z. The sheet-shaped electrodes 1 stacked inside this magazine Z are successively taken out by the electrode placement device B at the above-mentioned placement position (see FIG. 2) one sheet at a time and placed on conveyor plates 20 in an upper horizontal straight part 10*a* of the electrode conveyance device B.

While a sheet-shaped electrode 1 carried on a conveyor plate 20 at the upper horizontal straight rail part 10*a* is moving along the horizontal straight part 10*a* of the sheet-shaped electrode conveyance device B, first, to start, an end part of the copper foil 6 is cut to form a connection use electrode tab as tab cutting processing. Next, to prevent a short-circuit with the aluminum (positive electrode) foil, end insulation processing is performed for coating part of the copper foil 6 with an insulating material. Next, the sheet-shaped electrode 1 without a positive electrode is inspected.

Whether or not the connection use electrode tab is accurately formed and whether or not the insulating material is accurately coated is detected.

Next, aluminum (positive electrode) foil 2 is bonded on the sheet-shaped electrode 1 using an adhesive as positive electrode foil bonding processing. When the aluminum (positive electrode) foil 2 is bonded to the sheet-shaped electrode 1 carried on the conveyor plate 20, the sheet-shaped electrode 1 becomes the sheet-shaped electrode with a positive electrode of the cross-sectional shape shown in FIG. 1C. Next, whether the aluminum (positive electrode) foil 2 has been suitably bonded on the sheet-shaped electrode 1 is inspected as foil bonding inspection. Next, when stacking sheet-shaped electrodes 1 with positive electrodes, the aluminum (positive electrode) foil 2 is coated with an adhesive so that the stacked sheet-shaped electrodes 1 do not become offset as antislip coating processing.

Next, when the conveyor plate 20 reaches the semicircular part 10b of the electrode conveyance device B and starts to advance along the semicircular part 10b, as shown in FIG. 7, the conveyor plate 20 starts to be turned upside down. When the conveyor plate 20 reaches the bottom end part of the semicircular part 10b of the electrode conveyance device B, the conveyor plate 20 is turned completely upside down. In the present embodiment, the stacking action of the sheet-shaped electrodes 1 with positive electrodes is performed in the state with the conveyor plates 20 turned upside down. This stacking action will be explained later with reference to FIG. 8. Note that, when this stacking action is performed, the sheet-shaped electrodes 1 with positive electrodes are taken off from the conveyor plates 20 and the conveyor plates 20 become emptied. The conveyor plates 20 now in this empty state are successively moved to the placement position shown in FIG. 2.

Next, referring to FIG. 8, details of the jig conveyance device C will be explained while explaining the stacking action of sheet-shaped electrodes 1 with positive electrodes.

Figure 8:
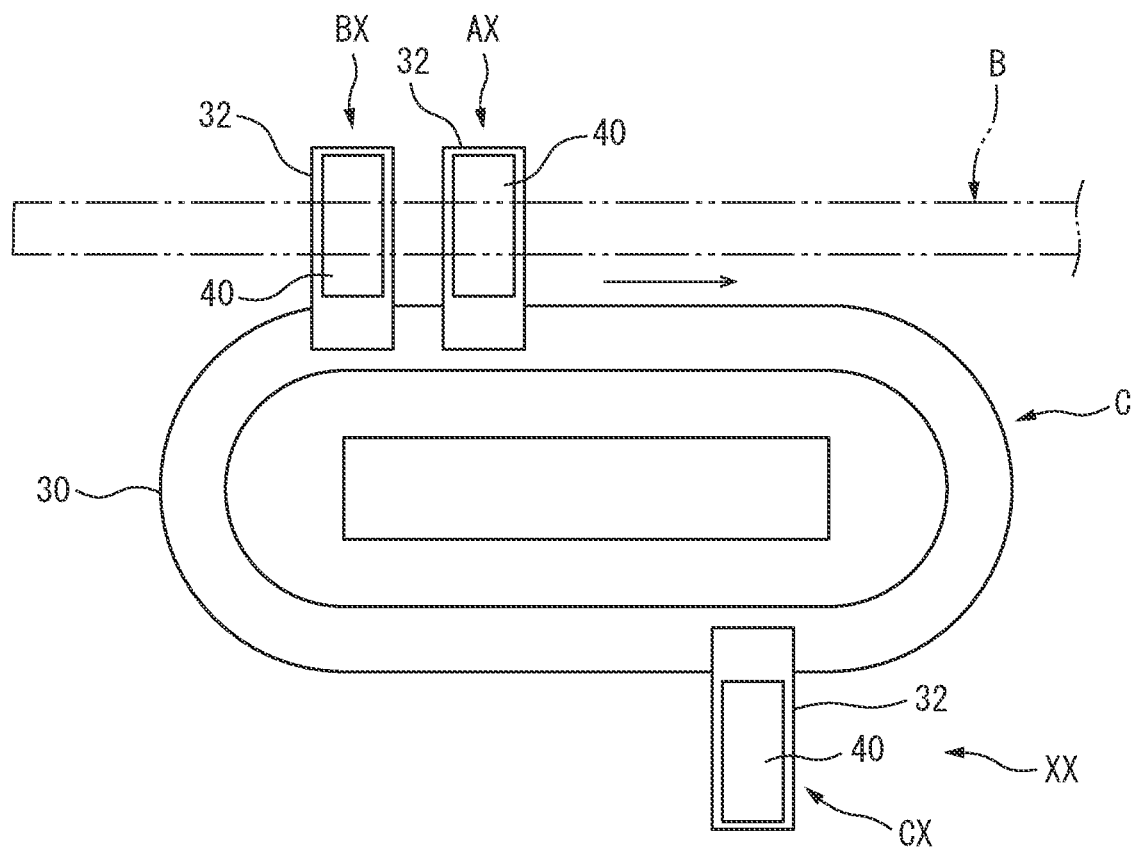
FIG. 8 is a plan view schematically showing an electrode conveyance device and jig conveyance device.

FIG. 8 is a plan view schematically illustrating the jig conveyance device C. This FIG. 8 shows the electrode conveyance device B by a broken line.

Referring to FIG. 2 and FIG. 8, the jig conveyance device C is a smaller version of the electrode conveyance device B and has a similar function to the electrode conveyance device B. That is, the jig conveyance device C is provided with an elliptical shaped rail 30 comprised of a pair of straight parts arranged alongside each other and a pair of semicircular parts and movers 31 of linear motors running on this rail 30. The movers 31 have structures similar to the mover 12 shown in FIG. 4. At the movers 31, end parts of conveyor platforms 32 extending from this elliptical shaped rail 30 outside in the horizontal direction are fixed. The conveyor platforms 32 carry the stacking jigs 40. Details of the stacking jigs 40 will be explained later with reference to FIG. 9.

Now then, as explained referring to FIG. 7, in the present embodiment, the stacking action of the sheet-shaped electrodes 1 with positive electrodes is performed in the state with the conveyor plates 20 turned upside down. At this time, as shown in FIG. 7, in the state with the top surface of the stacking jig 40 made to face a sheet-shaped electrode 1 placed on a conveyor plate 20, the clamping action of the clamps 21, 22, 23, and 24 of the conveyor plate 20 on the sheet-shaped electrode is released whereby the sheet-shaped electrode 1 placed on the conveyor plate 20 is made to drop to the inside of the stacking jig 40 and the sheet-shaped electrode 1 is stacked in the stacking jig 40. In this case, in the present embodiment, the conveyor plate 20 is made to move in the direction of advance while performing the stacking action, so while the stacking action is being performed, the stacking jig 40 is conveyed so that the top surface of the stacking jig 40 continues to face a sheet-shaped electrode 1 placed on a conveyor plate 20.

At the movers 31 of the jig conveyance device C, the end parts of conveyor stations 32 are fixed. On the conveyor stations 32, stacking jigs 40 are placed. Therefore, in the present embodiment, the jig conveyance device C is arranged so that while the stacking action is being performed, the top surfaces of the stacking jigs 40 can continue to face sheet-shaped electrodes 1 placed on conveyor plates 20, that is, so that while the stacking action is being performed, the stacking jigs 40 placed on the conveyor stations 32 can continue to move directly under the electrode conveyance device B. Furthermore, in the present embodiment, the conveyor plates 20 and conveyor stations 32 are made to move in synchronization so that while the stacking action is being performed, the top surfaces of the stacking jigs 40 can continue to face the sheet-shaped electrodes 1 placed on the conveyor plates 20

In the example shown in FIG. 8, the jig conveyance device C has three conveyor stations 32 supported by movers 31. On the conveyor stations 32, stacking jigs 40 are carried. These conveyor stations 32 are made to move by the movers 31 in the arrow direction. In FIG. 8, for example, when the work of stacking a sheet-shaped electrode 1 placed on a certain conveyor plate 20 to a stacking jig 40 is performed for the stacking jig 40 on the conveyor station 32 shown by AX, the work of stacking a sheet-shaped electrode 1 on the stacking jig 40 from the conveyor plate 20 following this conveyor plate 20 is performed for the stacking jig 40 on the conveyor station 32 shown by BX. On the other hand, the stacking jig 40 of the conveyor station 32 shown by CX shows the stacking jig 40 where the work of stacking the sheet-shaped electrode 1 on the stacking jig 40 has already been completed. When the work of stacking the sheet-shaped electrode 1 on the stacking jig 40 has been completed, the conveyor station 32 is made to move by a high speed to behind the preceding conveyor station 32, in FIG. 8, the conveyor station 32 shown by BX.

The sheet-shaped electrodes 1 successively conveyed by the conveyor plates 20 in this way are successively stacked one at a time inside the stacking jigs 40 of the successively conveyed conveyor stations 32. The work of stacking these sheet-shaped electrodes 1 at the stacking jigs 40 is performed at a high speed. Therefore, stacks of preset numbers of sheet-shaped electrodes 1 are formed at the stacking jigs 40 in a short time. When stacks of the preset number of sheet-shaped electrodes 1 are produced, the stacking jigs 40 are removed from the conveyor stations 32 of the jig conveyance device C while holding the stacks of the sheet-shaped electrodes 1 for the next processing and empty stacking jigs 40 are placed on the conveyor stations 32.

The stacking jigs 40 removed from the conveyor stations 32 of the jig conveyance device C are transported to a not shown press device where the work of compressing the stacks of sheet-shaped electrodes 1 is performed. Next, in the state with the stacks of sheet-shaped electrodes 1 compressed, the lateral parts of the stacks of the sheet-shaped electrodes 1 are coated with resin whereby the lateral parts of the sheet-shaped electrodes 1 are fastened to each other by the resin. Next, aluminum (positive electrode) foil 2 is bonded to the sheet-shaped electrodes 1 using an adhesive as processing for bonding the positive electrode foil. Next, the electrode tabs for connection use of the sheet-shaped electrodes 1 are bonded with terminals for taking out electric power as processing for connecting terminals. Due to this, an electrode stack of the sheet-shaped electrodes 1 is formed. The thus formed electrode stack is, for example, covered by a laminate film in a bag like manner. The plurality of electrode stacks covered by laminate films in a bag like manner are electrically connected in series or in parallel so as to form a battery to be mounted in, for example, a vehicle.

In this way, while the work of stacking sheet-shaped electrodes 1 on a stacking jig 40 is being performed, the side surface parts of the stack of the sheet-shaped electrodes 1 are still not fixed by resin, so it is necessary to configure the stacking jig 40 so as to be able to hold the stack so that the stacked sheet-shaped electrodes 1 do not become offset during the stacking work while receiving sheet-shaped electrodes 1 conveyed by the conveyor plates 20 without damaging them. Below, details of the stacking jig 40 according to the present embodiment will be explained.

Figure 9:
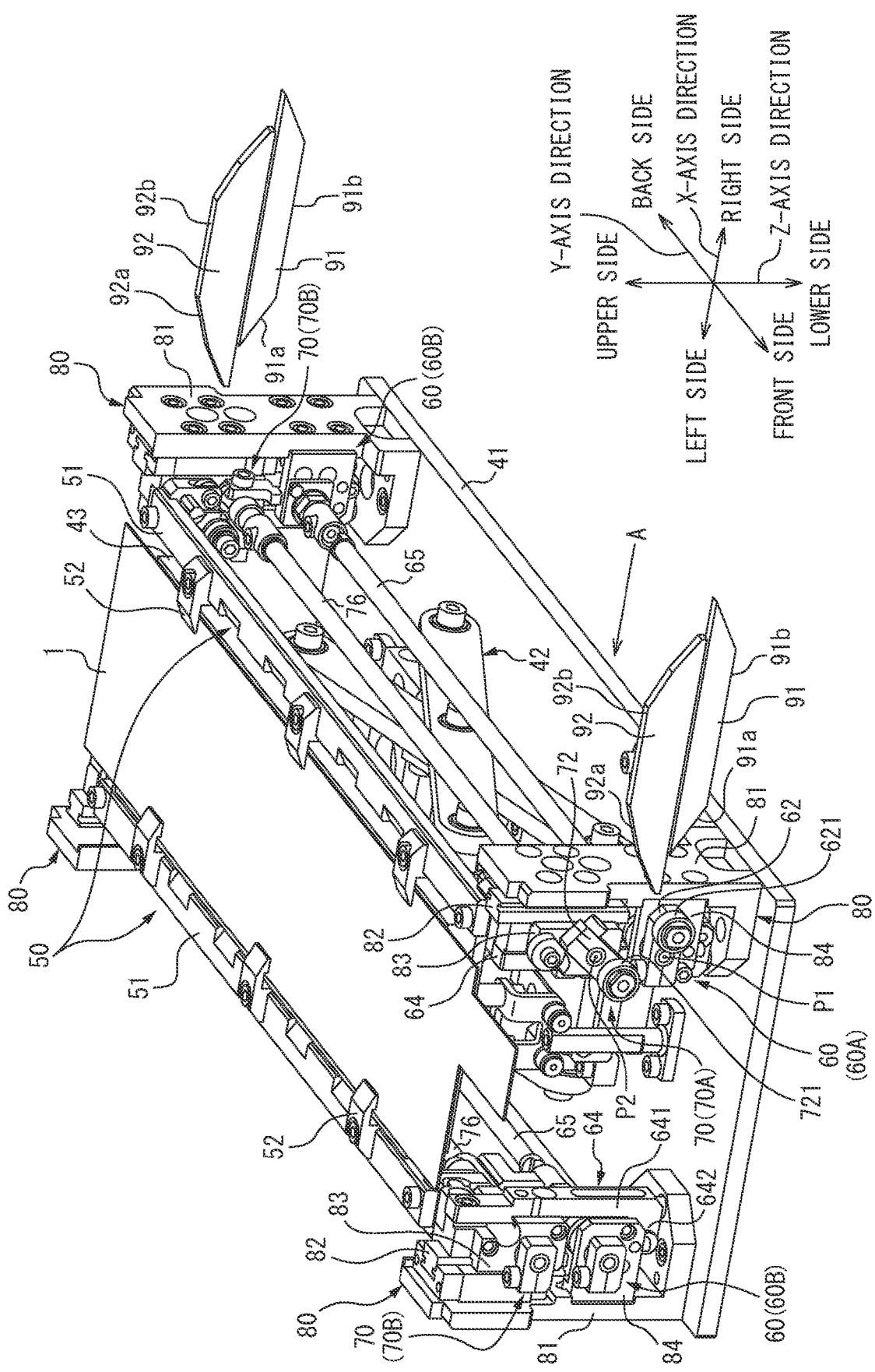
FIG. 9 is a schematic perspective view of a stacking jig according to an embodiment of the present disclosure.

FIG. 9 is a schematic perspective view of a stacking jig 40 carried on a conveyor platform 32 supported by a mover 31.

The stacking jig 40 is provided with a base 41, a pantograph type lift mechanism 42 attached on the base 41, and a bottom plate 43 supported by the pantograph type lift mechanism 42 and is configured so that the pantograph type lift mechanism 42 can constantly push the bottom plate 43 to the upper side in the vertical direction matching with the stacking direction of the sheet-shaped electrodes 1 stacked on the bottom plate 43.

Note that, in the following explanation, as shown in FIG. 9, the short direction of the bottom plate 43 is defined as the X-axis direction and one end side and the other end side of the short direction of the bottom plate 43 are respectively defined as the right side and left side. Further, the long direction of the bottom plate 43 is defined as the Y-axis direction and one end side and the other end side of the long direction of the bottom plate 43 are respectively defined as the front side and the back side. Further, the vertical direction is defined as the Z-axis direction and the upper side and the lower side of the vertical direction are respectively defined as the upper side and the lower side.

The stacking jig 40 is further provided with a pair of stack holding mechanisms 50 arranged at the right side and left side of the bottom plate 43 and is configured so that the stack holding mechanisms 50 can receive a sheet-shaped electrode 1 dropped from a conveyor plate 20 of the electrode conveyance device B onto the bottom plate 43 and hold the stack of sheet-shaped electrodes 1 formed on the bottom plate 43 by the successively received sheet-shaped electrodes 1. Note that, in FIG. 9, the stacking jig 40 is made to move to the right side parallel to the X-axis direction by the mover 31 supporting the conveyor platform 32 on which this stacking jig 40 is mounted.

Below, details of the stack holding mechanisms 50 will be explained.

As shown in FIG. 9, the stack holding mechanisms 50 are provided with clamp rods 51 extending in parallel with the Y-axis direction so as to follow along the bottom plate 43 and clamp arms 52 fixed to the clamp rods 51 for clamping the topmost layer sheet-shaped electrode 1 stacked on the bottom plate 43 from the upper side in the Z-axis direction. In the present embodiment, the clamp rods 51 respectively have three clamp arms 52 fixed to them, but the number of clamp arms fixed is not limited to three.

Further, the stack holding mechanisms 50 are provided at one end side (front side in Y-axis direction) and the other end side (back side in Y-axis direction) of the clamp rods 51 with slide mechanisms 60 for making the clamp rods 51 move up and down, tilt mechanisms 70 for making the clamp rods 51 tilt up, down, left, and right, and L-shaped support bases 80 supporting the slide mechanisms 60 and tilt mechanisms 70.

Below, while referring to FIG. 10 to FIG. 12 in addition to FIG. 9, the configurations of the slide mechanism 60 and tilt mechanism 70 arranged at the right side of the bottom plate 43 and one end side of the clamp rod 51 (front side in Y-axis direction) will be focused on in the explanation.

Figure 10:
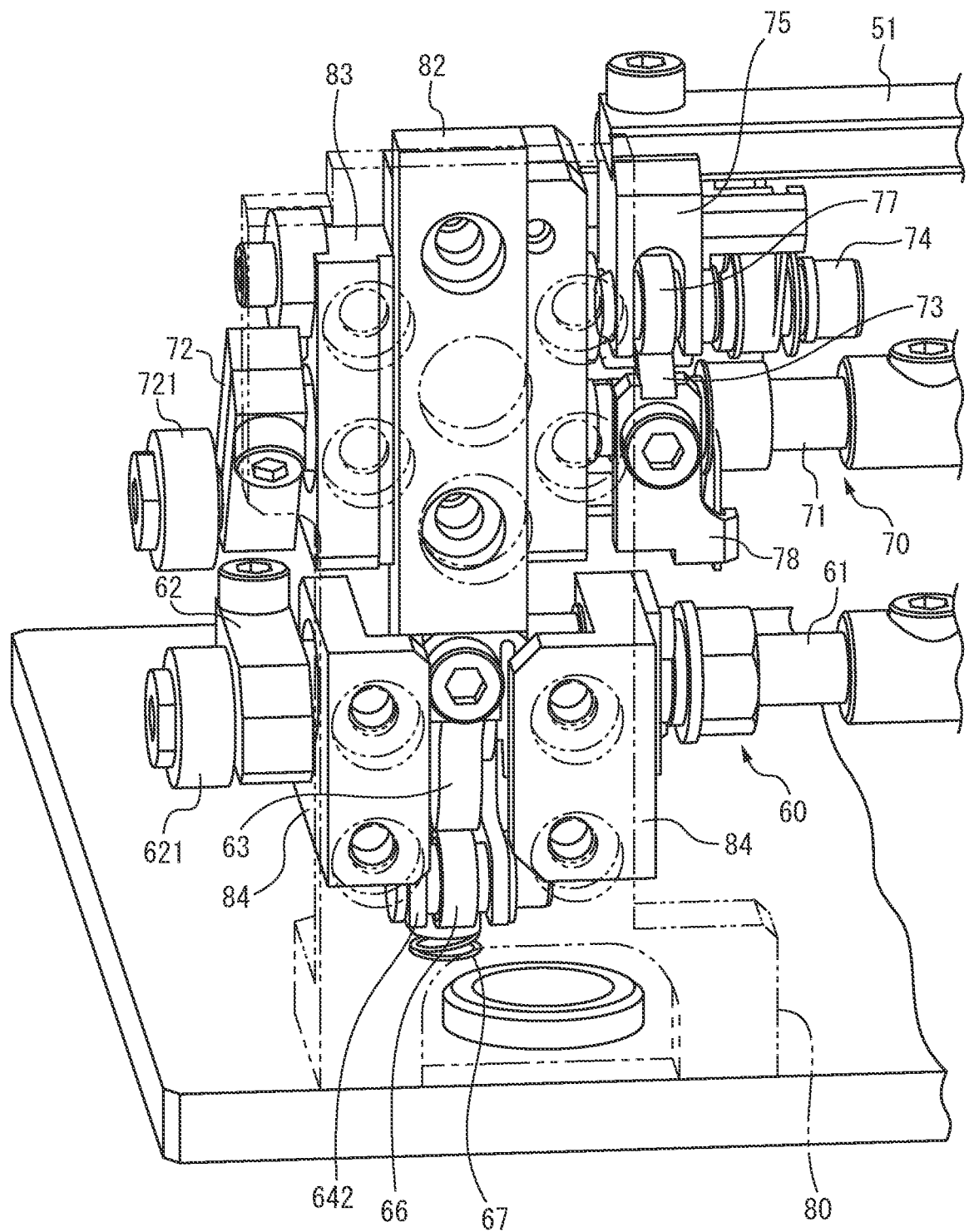
FIG. 10 is a schematic view of a slide mechanism and tilt mechanism according to an embodiment of the present disclosure seen from an arrow A direction of FIG. 9.

FIG. 10 is a schematic view of the slide mechanism 60 and tilt mechanism 70 at the right side of the bottom plate 43 and one end side of the clamp rod 51 (front side in Y-axis direction) seen from the arrow A direction of FIG. 9. Note that, in FIG. 10, to facilitate understanding of the disclosure, the support base 80 is shown by the two-dot chain line. FIG. 11 is a schematic partial perspective view of the slide mechanism 60 at the right side of the bottom plate 43 and one end side of the clamp rod 51 (front side in Y-axis direction). FIG. 12 is a schematic partial perspective view of the tilt mechanism 70 at the right side of the bottom plate 43 and one end side of the clamp rod 51 (front side in Y-axis direction).

As shown in FIG. 9, the support bases 80 fixed to the four corners of the base 41 are provided with fixing parts 81 extending from the base 41 side to the upper side in parallel with the Z-axis direction and have parts of the slide mechanisms 60 and tilt mechanisms 70 fixed to them.

At the upper side of each fixing part 81 of the support base 80, a linear rail 82 extending in parallel to the Z-axis direction is fixed. At the linear rail 82, a movable support member 83 supporting a later explained tilt-use drive shaft 71 (see FIG. 12) is attached to enable up and down movement in the Z-axis direction along the linear rail 82. Further, at the lower side of the fixed part 81 of the support base 80, a pair of fixing and support members 84 supporting the later explained slide-use drive shaft 61 (see FIG. 10 and FIG. 11) are fixed.

Figure 11:
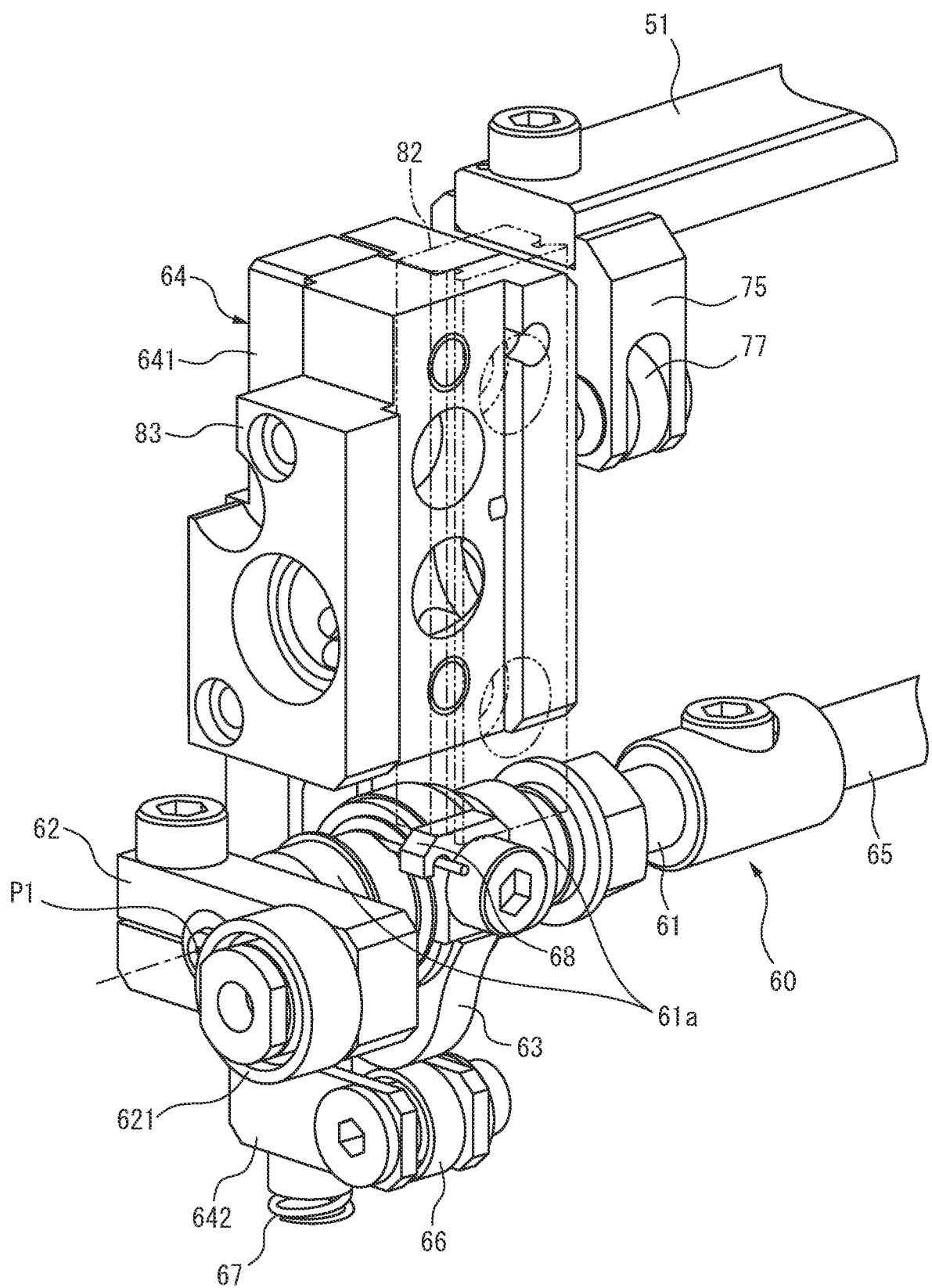
FIG. 11 is a schematic partial perspective view of the slide mechanism according to an embodiment of the present disclosure.

As shown in FIG. 9 to FIG. 11, each slide mechanism 60 is provided with a slide-use drive shaft 61, slide-use lever 62, slide-use cam 63, and slide-use arm 64.

As shown in FIG. 10 and FIG. 11, the slide-use drive shaft 61 is arranged parallel with the Y-axis direction by insertion of shaft support parts 61a (see FIG. 11) in bearing holes (not shown) of the pair of fixing and support members 84 fixed to the support base 80 and is supported to be able to rotate by the fixing and support members 84.

As shown in FIG. 9 to FIG. 11, each slide-use lever 62 is a rod-shaped member for making the slide-use drive shaft 61 rotate about its axial center P1 in two directions within a predetermined range of rotational angle. The base end side is fixed to the end part of the slide-use drive shaft 61 at the front side in the Y-axis direction. At the front end side of the slide-use lever 62, a roller follower 621 is attached. The roller follower 621 may be made to engage with a slide-use fixed cam 91 (see FIG. 9) arranged on a moving route of a mover 31 making a conveyor platform 32 on which the stacking jig 40 is mounted move along the rail 30 (see FIG. 8) to thereby push the slide-use lever 62 down about its axial center P1. By the slide-use lever 62 being pushed down about its axial center P1, the slide-use drive shaft 61 rotates about its axial center P1 clockwise within a predetermined range of rotational angle.

Further, at the inside of the slide-use lever 62, a not shown spring is housed. Due to this built-in spring, the slide-use lever 62 is acted on by a force constantly pushing up the slide-use lever 62, that is, a force trying to make the slide-use drive shaft 61 turn counter clockwise. For this reason, a slide-use lock member 68 for stopping counter clockwise rotation of the slide-use drive shaft 61 midway when the roller follower 621 of the slide-use lever 62 and slide-use fixed cam 91 are not engaged (see FIG. 11) is attached to the outer peripheral surface of the slide-use drive shaft 61 so that the slide-use lock member itself does not rotate even if the slide-use drive shaft 61 rotates.

Note that, as shown in FIG. 9 and FIG. 11, at the end part at the back side in the Y-axis direction of each slide-use drive shaft 61 at which the slide mechanism 60 of one end side of the clamp rod 51 (front side in Y-axis direction) is provided, the end part at the front side in the Y-axis direction of the slide-use connecting rod 65 is fixed, while at the end part at the back side in the Y-axis direction of the slide-use connecting rod 65, the end part at the front side in the Y-axis direction of the slide-use drive shaft 61 at which the slide mechanism 60 of the other end side of the clamp rod 51 (back side in Y-axis direction) is fixed.

For this reason, by making the slide-use lever 62 fixed to the end part of the front side in the Y-axis direction of the slide-use drive shaft 61 at one end side of the clamp rod 51 (front side in Y-axis direction) engage with the slide-use fixed cam 91 to make the slide-use drive shaft 61 of one end side of the clamp rod 51 (front side in Y-axis direction) rotate about its axial center P1, it is possible to make it rotate through the slide-use connecting rod 65 along with the slide-use drive shaft 61 at the other end side of the clamp rod 51 (back side in Y-axis direction).

Therefore, at the end part at the back side in the Y-axis direction of the slide-use drive shaft 61 at which the slide mechanism of the other end side of the clamp rod 51 (back side in Y-axis direction) is provided, no slide-use lever 62 is provided. Aside from this point, the configuration of the slide mechanism 60 at one end side of the clamp rod 51 and the configuration of the slide mechanism 60 at the other end side of the clamp rod 51 are basically the same. In the following explanation, in accordance with need, the slide mechanism 60 at which the slide-use lever 62 is provided will be referred to as the "lever-type slide mechanism 60A", while the slide mechanism 60 at which the slide-use lever 62 is not provided will be referred to as the "non-lever type slide mechanism 60B".

As shown in FIG. 10 and FIG. 11, the slide-use cam 63 is fixed to the outer peripheral surface of the slide-use drive shaft 61 by press-fitting so as to be positioned between the pair of fixing and support members 84.

As shown in FIG. 9 and FIG. 11, the slide-use arm 64 is provided with an arm fixing part 641 extending in parallel with the Z-axis direction and fixed to the surface of the movable support member 83 and a roller follower attachment part 642 extending from the bottom end of the arm fixing part 641 in parallel with the X-axis direction toward the slide-use drive shaft 61 side, arranged below the slide-use cam 63, and having a roller follower 66 for slide use abutting against the slide-use cam 63 attached to it. Between the bottom end surface of this roller follower attachment part 642 and the base 41, as shown in FIG. 11, a spring 67 is attached for constantly pushing the slide-use arm 64 to the upper side in the Z-axis direction.

Due to this, by making the slide-use cam 63 rotate about its axial center P1 together with the slide-use drive shaft 61 in two directions within a predetermined range of rotational angle, it is possible to transmit the movement of the slide-use cam 63 through the roller follower 66 for slide use to the slide-use arm 64 to make the slide-use arm 64 and in turn the movable support member 83 to which the arm fixing part 641 of the slide-use arm 64 is fixed move along the linear rail 82 up and down in the Z-axis direction. The detailed operation of this slide mechanism 60 will be explained later referring to FIG. 14.

Figure 12:
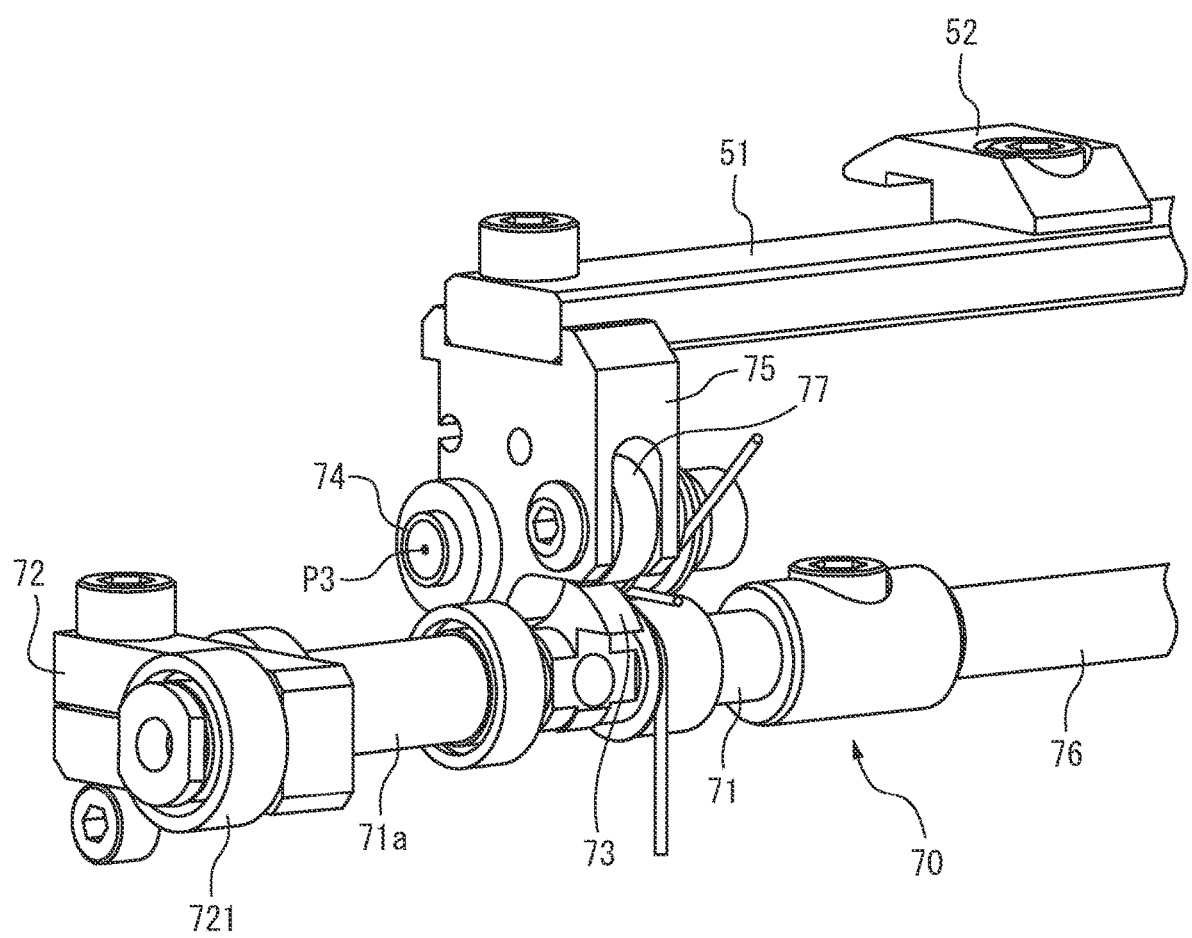
FIG. 12 is a schematic partial perspective view of the tilt mechanism according to an embodiment of the present disclosure.

As shown in FIG. 12, each tilt mechanism 70 is provided with a tilt-use drive shaft 71, tilt-use lever 72, tilt-use cam 73, tilt-use fixed shaft 74, and tilt-use arm 75.

The tilt-use drive shaft 71 is supported to be able to rotate by the movable support member 83 by being arranged in parallel with the Y-axis direction by the shaft support part 71a being inserted in a bearing hole of the movable support member 83 (not shown).

The tilt-use lever 72 is a rod-shaped member for making the tilt-use drive shaft 71 rotate about its axial center P2 in two directions within a predetermined range of rotational angle. Its base end side is fixed to the front side in the Y-axis direction of the end part of the tilt-use drive shaft 71. At the front end side of the tilt-use lever 72, a roller follower 721 is attached. By making this roller follower 721 engage with the tilt-use cam 92 (see FIG. 9) arranged on the moving route of the mover 31 making the conveyor platform 32 on which the stacking jig 40 is carried move along the rail 30 (see FIG. 8), it is possible to push up the tilt-use lever 72 about its axial center P2. By pushing up the tilt-use lever 72 about its axial center P2, the tilt-use drive shaft 71 rotates about its axial center P2 clockwise within a predetermined range of rotational angle.

Further, at the inside of the tilt-use lever 72, a not shown spring is housed. Due to this built-in spring, the tilt-use lever 72 is acted upon by a force constantly pushing down the tilt-use lever 72, that is, a force trying to make the tilt-use drive shaft 71 turn counter clockwise. For this reason, a tilt-use lock member 78 for stopping counter clockwise rotation of the tilt-use drive shaft 71 midway when the roller follower 721 of the tilt-use lever 72 and tilt-use fixed cam 92 are not engaged (see FIG. 10) is attached to the outer peripheral surface of the tilt-use drive shaft 71 so that the tilt-use lock member itself does not rotate even if the tilt-use drive shaft 71 rotates.

Note that, as shown in FIG. 9 and FIG. 12, at the end part at the back side in the Y-axis direction of the tilt-use drive shaft 71 at which the tilt mechanism 70 of one end side of the clamp rod 51 (front side in Y-axis direction) is provided, the end part at the front side in the Y-axis direction of the tilt-use connecting rod 76 is fixed, while at the end part at the back side in the Y-axis direction of the tilt-use connecting rod 76, the end part at the front side in the Y-axis direction of the tilt-use drive shaft 71 at which the tilt mechanism 70 of the other end side of the clamp rod 51 (back side in Y-axis direction) is fixed.

For this reason, by making the tilt-use lever 72 fixed to the end part at the front side in the Y-axis direction of the tilt-use drive shaft 71 at one end side of the clamp rod 51 (front side in Y-axis direction) engage with the tilt-use fixed cam 92 to make the tilt-use drive shaft 71 of one end side of the clamp rod 51 (front side in Y-axis direction) rotate about its axial center P2, it is possible to make it rotate through the tilt-use connecting rod 76 along with the tilt-use drive shaft 71 at the other end side of the clamp rod 51 (back side in Y-axis direction).

Therefore, the end part at the back side in the Y-axis direction of the tilt-use drive shaft 71 at which the tilt mechanism 70 of the other end side of the clamp rod 51 (back side in Y-axis direction) is provided, no tilt-use lever 72 is provided. Aside from this point, the configuration of the tilt mechanism 70 at one end side of the clamp rod 51 and the configuration of the tilt mechanism 70 at the other end side of the clamp rod 51 are basically the same. In the following explanation, in accordance with need, the tilt mechanism 70 at which the tilt-use lever 72 is provided will be referred to as the "lever-type tilt mechanism 70A", while the tilt mechanism 70 at which the tilt-use lever 72 is not provided will be referred to as the "non-lever-type tilt mechanism 70B".

The tilt-use cam 73 is fixed to the outer peripheral surface of the tilt-use drive shaft 71 by press-fitting etc.

The tilt-use fixed shaft 74 is arranged slanted above the tilt-use drive shaft 71 in parallel with the Y-axis direction by the end part of the front side in the Y-axis direction being fixed to a side surface of the movable support member 83. Therefore, if the slide mechanism 60 makes the movable support member 83 move up and down, linked with this, the tilt-use drive shaft 71 supported at the movable support member 83 and the tilt-use fixed shaft 74 fixed to the movable support member 83 move up and down while maintaining this positional relationship.

The tilt-use arm 75 is attached to be able to rotate at the outer peripheral surface of the tilt-use fixed shaft 74. At the top end surface of the tilt-use arm 75, one end part of the clamp rod 51 (end part of front side in Y-axis direction) is fixed. Further, at the tilt-use arm 75, a tilt-use roller follower 77 arranged above the tilt-use cam 73 and abutting against the slide-use cam 63 is attached.

Due to this, by making the tilt-use cam 73 rotate together with the tilt-use drive shaft 71 about its axial center P2 in two directions within a predetermined range of rotational angle, it is possible to transmit the movement of the tilt-use cam 73 through the tilt-use roller follower 77 to the tilt-use arm 75 to make the tilt-use arm 75 tilt about the axial center P3 of the tilt-use fixed shaft 74 to the left and right in the X-axis direction. The detailed operation of this tilt mechanism 70 will be explained later referring to FIG. 13.

Above, referring to FIG. 9 to FIG. 12, the configuration of the stack holding mechanism 50 arranged at the right side of the bottom plate 43 was explained, but next, referring to FIG. 9, the stack holding mechanism 50 arranged at the left side of the bottom plate 43 will also be simply explained.

The stack holding mechanisms 50 arranged at the right side and the left side of the bottom plate 43 are respectively configured the same, but as explained above for the stack holding mechanism 50 arranged at the right side of the bottom plate 43, at one end side of the clamp rod 51 (front side in Y-axis direction), the lever-type slide mechanism 60A and lever-type tilt mechanism 70A were arranged, while at the other end side of the clamp rod 51 (back side in Y-axis direction), a non-lever type slide mechanism 60B and non-lever-type tilt mechanism 70B were arranged.

As opposed to this, for the stack holding mechanism 50 arranged at the left side of the bottom plate 43, at one end side of the clamp rod 51 (front side in Y-axis direction), the non-lever type slide mechanism 60B and non-lever-type tilt mechanism 70B were arranged, while at the other end side of the clamp rod 51 (back side in Y-axis direction), a lever-type slide mechanism 60A and lever-type tilt mechanism 70A were arranged.

Therefore, regarding the stack holding mechanism 50 arranged at the left side of the bottom plate 43, in FIG. 9, when the slide-use fixed cam 91 shown at the back side in the Y-axis direction engages with the slide-use lever 62 of the lever-type slide mechanism 60A at the other end side of the clamp rod 51 (back side in Y-axis direction), the slide-use drive shaft 61 is made to rotate. Further, in FIG. 9, when the tilt-use fixed cam 92 shown at the back side in the Y-axis direction engages with the tilt-use lever 72 of the lever-type tilt mechanism 70A at the other end side of the clamp rods 51 (back side in Y-axis direction), the tilt-use drive shaft 71 is made to rotate.

In this way, in the present embodiment, in the pair of stack holding mechanisms 50 arranged at the right side and left side in the X-axis direction of the bottom plate 43, at one (right side) stack holding mechanism 50, the levers 62, 72 arranged at the front side in the Y-axis direction of the bottom plate 43 drive the slide mechanism 60 and tilt mechanism 70, while at the other (left side) stack holding mechanism 50, the levers 62, 72 arranged at the back side in the Y-axis direction of the bottom plate 43 drive the slide mechanism 60 and tilt mechanism 70. That is, the pair of stack holding mechanism 50 are designed to be able to be respectively independently driven.

Figure 13:
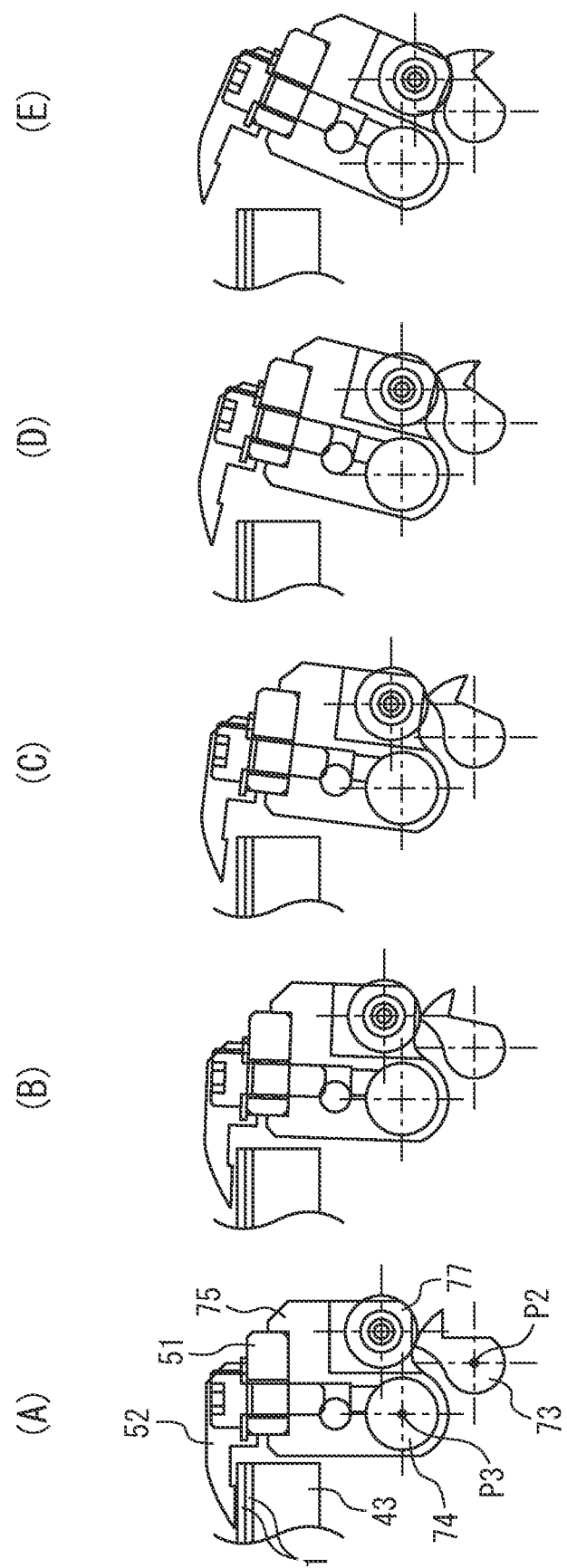
FIG. 13 is a view explaining details of operation of the tilt mechanism according to an embodiment of the present disclosure.

FIG. 13 is a view explaining details of the operation of the tilt mechanism 70 which the stack holding mechanism 50 arranged at the right side of the bottom plate 43 is provided with.

FIG. 13(A) shows the state where the roller follower of the tilt-use lever 72 is not engaged with the tilt-use fixed cam 92, that is, the state where the tilt-use lever 72 is not pushed up.

At the time of this state, as shown in FIG. 13(A), the tilt-use arm 75 is supported by the tilt-use cam 73 so that the clamp rod 51 fixed to the top end surface of the tilt-use arm 75 is maintained horizontal. As a result, the topmost layer sheet-shaped electrode 1 stacked on the bottom plate 43 is clamped by the clamp arms 52 fixed to the clamp rod 51 from the upper side in the Z-axis direction. Below, the time of this state will be referred to as the "clamped state".

FIG. 13(B) to FIG. 13(D) show the state of the process by which the roller follower of the tilt-use lever 72 engages with the first cam face 92a of the tilt-use fixed cam 92 (see FIG. 9) and the tilt-use lever 72 is pushed up.

If the tilt-use lever 72 is pushed up, as shown in FIG. 13(B) to FIG. 13(D), the tilt-use cam 73 gradually rotates clockwise about its axial center P2 together with the tilt-use drive shaft 71. As a result, the tilt-use roller follower 77 attached to the tilt-use arm 75 rolls along the cam faces of the tilt-use cam 73. Due to this, the tilt-use arm 75 rotates clockwise in the figure about the axial center P3 of the tilt-use fixed shaft 74. As a result, the clamp arms 52 can be made to retract to the right side in the X-axis direction, that is, a direction away from the bottom plate 43, while the clamp arms 52 can be opened to the upper side. That is, it is possible to release the clamping action of the clamp arms 52 on the topmost layer sheet-shaped electrode 1 and shift to the "unclamped state" shown in FIG. 13(E).

FIG. 13(E) shows the state where the roller follower of the tilt-use lever 72 of the tilt-use cam 73 engages with a second cam face of the tilt-use fixed cam 92 and the tilt-use lever 72 is pushed up to the maximum. If becoming this state, the front ends of the clamp arms 52 are completely retracted from the upper side in the Z-axis direction of the bottom plate 43. Below, the time of this state will be referred to as the "unclamped state".

Figure 14:
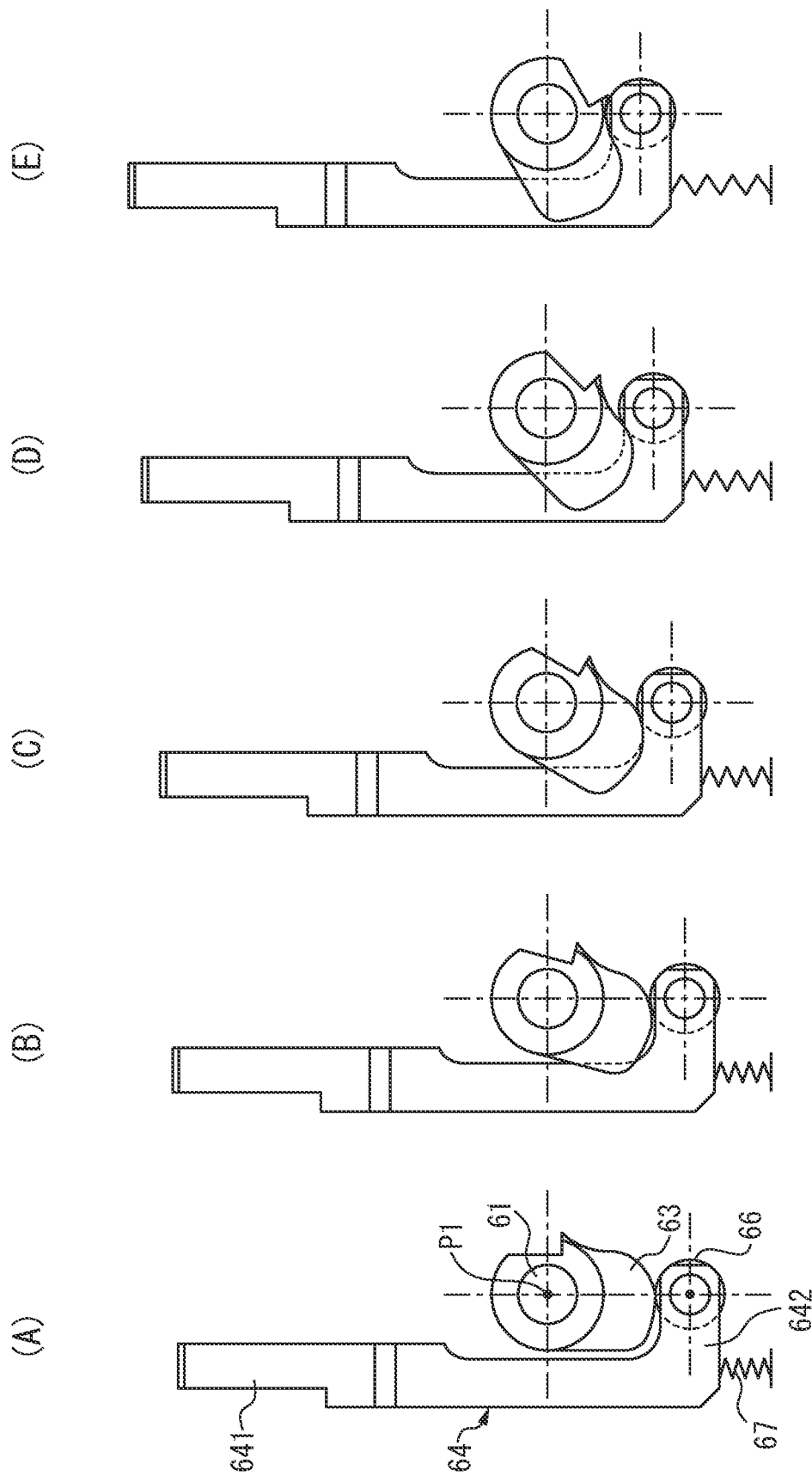
FIG. 14 is a view explaining details of operation of the slide mechanism according to an embodiment of the present disclosure.

FIG. 14 is a view explaining the operation of the slide mechanism 60 which the stack holding mechanism 50 arranged at the right side of the bottom plate 43 is provided with.

FIG. 14(A) shows the state where the roller follower of the tilt-use lever 72 is not engaged with the tilt-use fixed cam 92 and the roller follower of the slide-use lever 62 is not engaged with the slide-use fixed cam 91. That is, this shows the state where the tilt-use lever 72 is not pushed up, the tilt mechanism 70 renders the clamp arms 52 the clamped state, and the slide-use lever 62 is not pushed down.

At the time of this state, as shown by FIG. 14(A), due to the slide-use cam 63, the slide-use arm 64 is pushed down to its lowest position against the biasing force of the spring 67 pushing up the clamp arms 52 to the upper side in the Z-axis direction and the later explained reaction force trying to push up the clamp arms 52 to the upper side in the Z-axis direction. In other words, when in the state where the tilt-use lever 72 is not pushed up and the clamp arms 52 are rendered the clamped state by the tilt mechanism 70 and the slide-use lever 62 is not pushed down, the slide-use cam 63 is fixed to the slide-use drive shaft 61 so as to enable the slide-use arm 64 to be pushed toward the lower side in the stacking direction by the slide-use cam 63 to push down the slide-use arm 64 to its lowest position.

Below, the reaction force trying to push up the clamp arms 52 to the upper side in the Z-axis direction will be briefly explained. As explained above, the bottom plate 43 is constantly pushed by the pantograph type lift mechanism 42 to the upper side in the Z-axis direction. For this reason, when the clamp arms 52 are rendered the clamped state by the tilt mechanism 70, that is, when the topmost layer sheet-shaped electrode stacked on the bottom plate 43 is clamped by the clamp arms 52, the clamp arms 52 are acted on by a reaction force trying to push up the clamp arms 52 to the upper side in the Z-axis direction. As a result, when the clamp arms 52 are rendered the clamped state by the tilt mechanism 70, this reaction force acts, as a reaction force trying to push up the clamp arms 52 to the upper side in the Z-axis direction, on the clamp arms 52 through the clamp rod 51, tilt mechanism 70, and movable support member 83 supporting the tilt-use drive shaft 71 of the tilt mechanism 70.

FIG. 14(B) to FIG. 14(D) show the state of the process by which the roller follower of the slide-use lever 62 engages with the first cam face 91a of the slide-use fixed cam 91 and the slide-use lever 62 is pushed down when the clamp arms 52 are rendered the unclamped state by the tilt mechanism 70.

If the slide-use lever 62 is pushed down, as shown in FIG. 14(B) to FIG. 14(D), the slide-use cam 63 gradually rotates about its axial center P1 clockwise together with the slide-use drive shaft 61. As a result, the slide-use roller follower 66 pushed by the spring 67 through the slide-use arm 64 against the cam faces of the slide-use cam 63 rolls along the cam faces of the slide-use cam 63 and the height of the abutting surfaces of the cam faces of the slide-use cam 63 and the slide-use roller follower 66 gradually moves upward. As a result, the slide-use arm 64 can be made to move to the upper side in the Z-axis direction and in turn the clamp arms 52 can be made to move to the upper side in the Z-axial direction together with the clamp rod 51 through the movable support member 83 to which the clamp arms 52 are fixed.

FIG. 14(E) shows the state where the roller follower of the slide-use lever 62 engages with the second cam face 91b of the slide-use fixed cam 91 and the slide-use lever 62 is completely pushed down. When becoming this state, the slide-use arm 64 and in turn the clamp arms 52 fixed to the clamp rods 51 are made to move to the uppermost side.

Next, referring to FIG. 15, the method of holding the stack by the stacking jig 40 will be explained. Note that, below, in accordance with need, the sheet-shaped electrode 1 held on the conveyor plate 20 will be referred to as the "new sheet-shaped electrode 1" and the sheet-shaped electrodes 1 already present on the bottom plate 43 of the stacking jig 40 will be referred to as the "stacked sheet-shaped electrodes 1".

Figure 15:
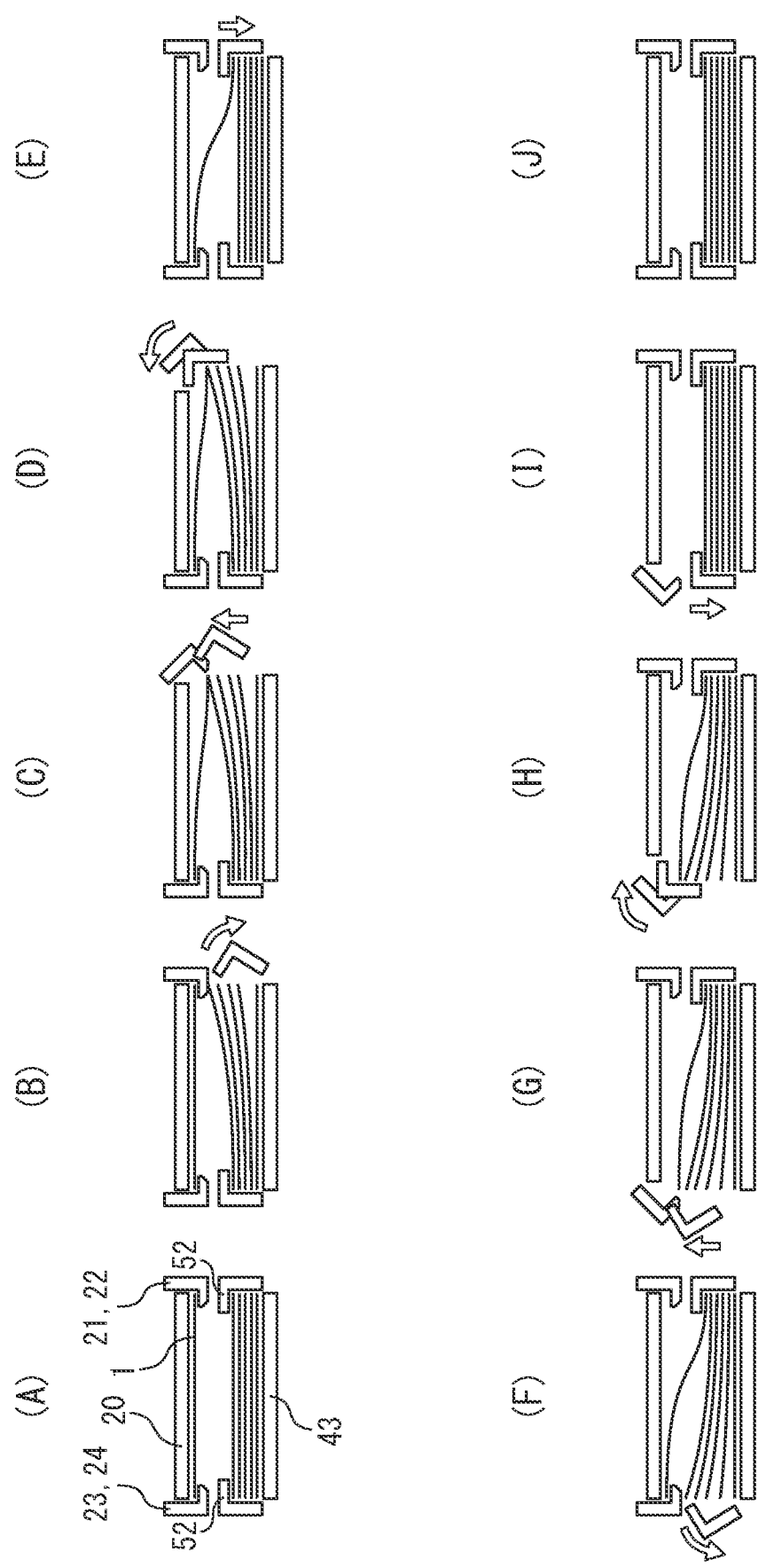
FIG. 15 is a view explaining a method of holding a stack using a stacking jig.

FIG. 15 shows the state where a sheet-shaped electrode 1 held on a conveyor plate 20 and a top surface of a bottom plate 43 of a stacking jig 40 are made to face each other and the state where the conveyor plate 20 and the conveyor platform 32 on which the stacking jig 40 is carried synchronously move to the right side in the figure.

As shown in FIG. 15(A), if the sheet-shaped electrode 1 carried on the conveyor plate 20 and the top surface of the bottom plate 43 of the stacking jig 40 are made to face each other, the clamp arms 52 at the left side in the figure are used to clamp the peripheral part at the left side of the stacked sheet-shaped electrode 1. In that state, the roller follower 721 of the tilt-use lever 72 of one stack holding mechanism 50 at the right side in the figure engages with the tilt-use fixed cam 92 (front side in Y-axis direction of FIG. 9). Due to this, the tilt-use lever 72 is pushed up whereby the tilt-use drive shaft 71 rotates and, as shown in FIG. 15(B), the clamp arms 52 of the one stack holding mechanism 50 at the right side of the figure open.

If the clamp arms 52 of the one stack holding mechanism 50 at the right side of the figure open, next the roller follower 621 of the slide-use lever 62 of that one stack holding mechanism 50 engages with the slide-use fixed cam 91 (front side in Y-axis direction of FIG. 9). Due to this, the slide-use lever 62 is pushed down whereby the slide-use drive shaft 61 rotates and, as shown in FIG. 15(C), the clamp arms 52 of the one stack holding mechanism 50 at the right side of the figure move upward. Further, along with this, the hold on the new sheet-shaped electrode 1 by the clamps 21, 22 of the conveyor plate 20 is released. Due to this, the right side peripheral part of the new sheet-shaped electrode 1 which had been held by the clamps 21, 22 of the conveyor plate 20 is made to drop onto the stacked sheet-shaped electrodes 1.

Further, as shown in FIG. 15(D), if the clamp arms 52 of the one stack holding mechanism 50 at the right side in the figure finish moving upward, the roller follower 721 of the tilt-use lever 72 and the tilt-use fixed cam 92 (front side in Y-axis direction of FIG. 9) are disengaged. Due to this, the tilt-use lever 72 is returned by the built-in spring to the position before engagement and the clamp arms 52 of the one stack holding mechanism 50 at the right side in the figure are returned to the closed state.

Further, as shown in FIG. 15(E), if the clamp arms 52 of the one stack holding mechanism 50 at the right side in the figure are returned to the closed state, the roller follower 621 of the slide-use lever 62 and the slide-use fixed cam 91 (front side in Y-axis direction of FIG. 9) are disengaged. Due to this, the slide-use lever 62 is returned by the built-in spring to the position before engagement and the clamp arms 52 of the one stack holding mechanism 50 at the right side in the figure are made to move downward. The right side peripheral part of the new sheet-shaped electrode 1 dropped onto the stacked sheet-shaped electrodes 1 is clamped by the clamp arms 52.

Further, as shown in FIG. 15(F), if the right side peripheral part of the stacked sheet-shaped electrodes 1 are clamped by the clamp arms 52 at the right side in the figure, next, the roller follower 721 of the tilt-use lever 72 of the other stack holding mechanism 50 at the left side in the figure engages with the tilt-use fixed cam 92 (back side in Y-axis direction of FIG. 9). Due to this, the tilt-use lever 72 is pushed up whereby the tilt-use drive shaft 71 rotates and the clamp arms 52 of the other stack holding mechanism 50 at the left side in the figure open.

If the clamp arms 52 of the other stack holding mechanism 50 at the left side in the figure open, next, the roller follower 621 of the slide-use lever 62 of the other stack holding mechanism 50 engages with the slide-use fixed cam 91 (back side in Y-axis direction of FIG. 9). Due to this, the slide-use lever 62 is pushed down whereby the slide-use drive shaft 61 rotates and, as shown in FIG. 15(G), the clamp arms 52 of the other stack holding mechanism 50 at the left side in the figure move upward. Further, along with this, the hold on the new sheet-shaped electrode 1 by the clamps 23, 24 of the conveyor plate 20 is released. Due to this, the left side peripheral part of the new sheet-shaped electrode 1 which had been held by the clamps 23, 24 at the conveyor plate 20 is made to drop onto the stacked sheet-shaped electrodes 1.

Further, as shown in FIG. 15(H), when the clamp arms 52 of the other stack holding mechanism 50 at the left side in the figure finish moving upward, the roller follower 721 of the tilt-use lever 72 (back side in Y-axis direction of FIG. 9) and tilt-use fixed cam 92 disengage. Due to this, the tilt-use lever 72 is returned by the built-in spring to the position before engagement and the clamp arms 52 of the other stack holding mechanism 50 at the left side in the figure are returned to the closed state.

Further, as shown in FIG. 15(I), if the clamp arms 52 of the other stack holding mechanism 50 at the left side in the figure are returned to the closed state, the roller follower 621 of the slide-use lever 62 and the slide-use fixed cam 91 (back side in Y-axis direction of FIG. 9) disengage. Due to this, the slide-use lever 62 is returned by a built-in spring to the position before engagement, the clamp arms 52 of the other stack holding mechanism 50 at the left side in the figure are made to move downward, and the right side peripheral part of the new sheet-shaped electrode 1 dropped onto the stacked sheet-shaped electrodes 1 is clamped by the clamp arms 52. Due to this, the work of stacking one sheet-shaped electrode 1 on the stacking jig 40 is completed.

The above explained stacking jig 40 according to the present embodiment (stack holding apparatus) is provided with a bottom plate 43 (stacking platform) on which the sheet-shaped electrodes 1 (sheet members) are stacked, a pantograph type lift mechanism 42 (pressing mechanism) constantly pressing the bottom plate 43 toward an upper side in the stacking direction of the sheet members 1 stacked on the bottom plate 43, a pair of clamp rods 51 arranged in parallel with a front-back direction of the bottom plate 43 so as to face the two left and right sides of the bottom plate 43, clamp arms 52 fixed to the clamp rods 51 and clamping the sheet members 1 stacked on the bottom plate 43 from an upper side in the stacking direction, a slide mechanism 60 making the clamp rods 51 move parallel to the stacking direction, and a tilt mechanism 70 making the clamp arms 52 tilt so that the clamp arms 52 open in an upper side in the stacking direction while moving away from the bottom plate 43 and further so that the clamp arms 52 approach the bottom plate 43 while closing toward the lower side in the stacking direction.

Due to this, when the clamping action of the sheet-shaped electrodes 1 by the clamp arms 52 is released, the tilt mechanism 70 can be used to make the clamp rod 51 tilt to thereby render the clamp arms 52 an unclamped state so that the clamp arms 52 open to the upper side in the stacking direction while moving away from the bottom plate 43. For this reason, when opening the clamp arms 52, the surfaces of the peripheral edge parts of the sheet-shaped electrodes 1 can be kept from being rubbed against by the clamp arms 52, so the peripheral edge parts of the sheet-shaped electrodes 1 can be kept from ending up being damaged.

Further, when using the clamp arms 52 to clamp the sheet-shaped electrodes 1, the slide mechanism 60 can be used to make the clamp arms 52 rise once together with the clamp rod 51 while using the tilt mechanism 70 to render the clamp arms 52 the clamped state, then use the slide mechanism 60 to make the clamp arms 52 descend together with the clamp rod 51. For this reason, even when using the clamp arms 52 to clamp the sheet-shaped electrodes 1, it is possible to use the clamp arms 52 to clamp the sheet-shaped electrodes 1 from the upper side without rubbing against the surface of the peripheral edge parts of the sheet-shaped electrodes 1 by the clamp arms 52.

Furthermore, the tilt mechanism 70 makes the clamp rods 51 tilt so that the clamp arms 52 open to the upper side in the stacking direction while moving away from the bottom plate 43, so the clamp arms 52 and the outer peripheral edges of the sheet-shaped electrodes 1 (side surfaces of stack) will never contact. For this reason, when operating the clamp arms 52, it is possible to keep the clamp arms 52 from ending up damaging the outer peripheral edges of the sheet-shaped electrodes 1.

Further, the stacking jig 40 according to the present embodiment (stack holding apparatus) is configured to enable the slide mechanism 60 and tilt mechanism 70 for one of the clamp rods in the pair of clamp rods 51 and the slide mechanism 60 and tilt mechanism 70 for the other of the clamp rods to be respectively independently driven.

Due to this, the clamp arms 52 fixed to one clamp rod 51 in the pair of clamp rods 51 can be used to clamp the peripheral part of one side of the stacked sheet-shaped electrodes 1 stacked on the bottom plate 43 while driving the other slide mechanism 60 and tilt mechanism 70 for clamp rod use to open the clamp arms 52. Further, by making the peripheral part of the other side of the new sheet-shaped electrode 1 on the stacked sheet-shaped electrodes 1 drop down, then driving the other slide mechanism 60 and tilt mechanism 70 for clamp rod use, the clamp arms 52 fixed to the other clamp rod 51 can be used to clamp the peripheral part of the other side of the new sheet-shaped electrode 1 with the peripheral part at the other side dropped onto the stacked sheet-shaped electrodes 1.

After that, the clamp arms 52 fixed to the other clamp rod 51 can be used to clamp the peripheral part of the other side of the new sheet-shaped electrodes 1 with the peripheral part of the other side dropped onto the stacked sheet-shaped electrodes 1 while driving the slide mechanism 60 and tilt mechanism 70 for the other clamp rod to open the clamp arms 52. Further, by making the peripheral part of one side of the new sheet-shaped electrode 1 drop onto the stacked sheet-shaped electrodes 1, then driving the slide mechanism 60 and tilt mechanism 70 for the other clamp rod, it is possible use the clamp arms 52 fixed to the one clamp rod 51 to clamp the peripheral part of the one side of the new sheet-shaped electrode 1 with the peripheral part of one side dropped onto the stacked sheet-shaped electrodes 1.

That is, it is possible to clamp one side of the stacked sheet-shaped electrodes 1 while dropping the peripheral part of the other side of the new sheet-shaped electrode 1 onto the stacked sheet-shaped electrodes 1 to thereby clamp the peripheral part of the other side of the new sheet-shaped electrode 1 with the peripheral part of the other side made to drop onto the stacked sheet-shaped electrodes 1.

After that, the peripheral part of the other side of the new sheet-shaped electrode 1 whose peripheral part of the other side has been dropped onto the stacked sheet-shaped electrodes 1 is clamped while making the peripheral part of the one side of the new sheet-shaped electrode 1 drop onto the stacked sheet-shaped electrodes 1 so as to enable the peripheral part of one side of the new sheet-shaped electrode 1 whose peripheral part of one part has been dropped onto the stacked sheet-shaped electrodes 1 to be clamped and end the stacking of the new sheet-shaped electrode 1 on the stacked sheet-shaped electrodes 1.

In this way, according to the stacking jig 40 according to the present embodiment, when stacking a new sheet-shaped electrode 1 on the stacked sheet-shaped electrodes 1 on the bottom plate 43, it is possible to constantly clamp one end side or the other end side of the stacked sheet-shaped electrodes 1 by the clamp arms 52, so during stacking work, it is possible to keep the stacked sheet-shaped electrodes 1 from being offset.

Further, the slide mechanism 60 of the stacking jig 40 according to the present embodiment (stack holding apparatus) specifically is configured provided with a slide-use drive shaft 61 supported to be able to rotate in parallel with the front-back direction of the bottom plate 43 (stacking platform), a slide-use cam 63 fixed to the slide-use drive shaft 61, a slide-use arm 64 abutting against the slide-use cam 63 and converting the rotational motion of the slide-use cam 63 to linear motion parallel to the stacking direction, and a movable support member 83 (movable member) fixed to the slide-use arm 64 and moving together with the slide-use arm 64 in parallel with the stacking direction. Further, the tilt mechanism 70 is configured provided with a tilt-use drive shaft 71 supported to be able to rotate at the movable support member 83 in parallel with the front-back direction of the bottom plate 43, a tilt-use fixed shaft 74 fixed to the movable support member 83 and arranged in parallel with the tilt-use drive shaft 71, a tilt-use cam 73 fixed to the tilt-use drive shaft 71, and a tilt-use arm 75 with one end side supported to be able to rotate at the tilt-use fixed shaft 74 and with the other end side abutting against the tilt-use cam 73 and converting rotational motion of the tilt-use cam 73 to tilting motion about the tilt-use fixed shaft 74. Further, the clamp rods 51 are fixed to the tilt-use arm 75.

Due to this, by making the slide-use drive shaft 61 rotate, the tilt-use drive shaft 71 supported at the movable support member 83 and the tilt-use fixed shaft 74 fixed to the movable support member 83 can be made to move up and down through the slide-use arm 64 and movable support member 83 while maintaining the positional relationship to make the clamp rod 51 fixed to the tilt-use arm 75 and in turn the clamp arms 52 move up and down. Further, by making the tilt-use drive shaft 71 rotate, the tilt-use arm 75 can be made to tilt about the tilt-use fixed shaft 74 and the clamp rods 51 can be made to tilt so that clamp arms 52 open to the upper side in the stacking direction while moving away from the bottom plate 43 and so that the clamp arms 52 approach the bottom plate 43 while closing toward the lower side in the stacking direction.

Further, in the present embodiment, the slide-use cam 63 is fixed to the slide-use drive shaft 61 so that when the slide-use arm 64 is positioned at the lower side in the stacking direction, the slide-use arm 64 can be pushed toward the lower side in the stacking direction.

Due to this, even if a reaction force trying to push up the clamp arms 52 to the upper side in the stacking direction upper side acts on the clamp arms 52, the slide-use cam 63 can prevent the slide-use arm 64 from ending up moving to the upper side in the stacking direction.

Further, the slide mechanisms 60 and tilt mechanisms 70 of the stacking jig 40 according to the present embodiment (stack holding apparatus) are respectively arranged at one end sides of the clamp rods 51 extending in parallel with the front-back direction of the bottom plate 43 (stacking platform) (front side of bottom plate 43) and the other end sides (back side of bottom plate 43). Further, the stacking jig 40 is further provided with a slide-use lever 62 provided at the slide-use drive shaft 61 of either slide mechanism 60A in the slide mechanisms 60 respectively arranged at one end side and the other end side of the clamp rods 51 and making the slide-use drive shaft 61 rotate, a tilt-use lever 72 provided at the tilt-use drive shaft 71 of either tilt mechanism 70A in the tilt mechanisms 70 respectively arranged at one end side and the other end side of the clamp rods 51 and making the tilt-use drive shaft rotate 71, a slide-use connecting rod 65 connecting the slide-use drive shafts 61 of the slide mechanisms 60 respectively arranged at one end side and the other end side of the clamp rods 51 and rotating together with the slide-use drive shafts 61, and a tilt-use connecting rod 76 connecting the tilt-use drive shafts 71 of the tilt mechanisms 70 respectively arranged at one end side and the other end side of the clamp rods 51 and rotating together with the tilt-use drive shafts 71.

Further, the slide-use levers 62 and tilt-use levers 72 are respectively provided with the slide mechanism 60A and tilt mechanism 70A of one end side of the clamp rod 51 (front side of bottom plate 43) at one clamp rod 51 side (right side of bottom plate 43) in the pair of clamp rods 51 arranged at the two left and right sides of the bottom plate 43 and are respectively provided with the slide mechanism 60A and tilt mechanism 70A of the other end side of the clamp rod 51 (back side of bottom plate 43) at the other clamp rod 51 side (left side of bottom plate 43).

That is, the slide-use lever 62 and tilt-use lever 72 are arranged at the front side of the bottom plate 43 for the slide mechanism 60A and tilt mechanism 70A arranged at the right side of the bottom plate 43, while the slide-use lever 62 and tilt-use lever 72 are arranged at the back side of the bottom plate 43 for the slide mechanism 60A and tilt mechanism 70A arranged at the right side of the bottom plate 43.

Due to this, as shown in FIG. 9, the slide-use fixed cam 91 and tilt-use fixed cam 92 engaging with the slide-use lever 62 and tilt-use lever 72 at the front side of the bottom plate 43 (front side in Y-axis direction) and the slide-use fixed cam 91 and tilt-use fixed cam 92 engaging with the slide-use lever 62 and tilt-use lever 72 at the back side of the bottom plate 43 (back side in Y-axis direction) can be made respectively independent.

For this reason, for example, it is possible to individually adjust the X-direction lengths of the cam faces 91*a*, 91*b*, 92*a*, 92*b* of the slide-use fixed cam 91 and tilt-use fixed cam 92 of the front side and back side of the bottom plate 43 to any lengths.

Therefore, for example, by making the X-direction lengths of the cam faces 91*a*, 91*b*, 92*a*, 92*b* of the tilt-use fixed cam 92 longer, it is possible to lengthen the time until again clamping the sheet-shaped electrodes 1 by the clamp arms 52 after releasing the clamping action of the sheet-shaped electrodes 1 by the clamp arms 52. For this reason, it is possible to sufficiently secure the time for performing a stacking action in the state where the sheet-shaped electrodes 1 held on the conveyor plate 20 and the top surface of the bottom plate 43 of the stacking jig 40 are made to face each other.

Above, embodiments of the present disclosure were explained, but the embodiments just show some of the examples of application of the present disclosure and are not meant to limit the technical scope of the present disclosure to the specific configuration of the above embodiments.

The invention claimed is:

1. A stack holding apparatus comprising:
a stacking platform on which sheet members are stacked;
a pressing mechanism constantly pressing the stacking platform toward an upper side in the stacking direction of the sheet members stacked on the stacking platform;
a pair of clamp rods arranged in parallel with a front-back direction of the stacking platform so as to face the two left and right sides of the stacking platform;
clamp arms fixed to the clamp rods and clamping the sheet members stacked on the stacking platform from an upper side in the stacking direction;
slide mechanisms making the clamp rods move parallel to the stacking direction; and
tilt mechanisms making the clamp arms tilt so that the clamp arms open to an upper side in the stacking direction while moving away from the stacking platform and further so that the clamp arms approach the stacking platform while closing to the lower side in the stacking direction.

2. The stack holding apparatus according to claim 1, wherein
the slide mechanism and the tilt mechanism for one clamp rod among the pair of the clamp rods and the slide mechanism and the tilt mechanism for the other clamp rod are configured to be respectively independently driven.

3. The stack holding apparatus according to claim 1, wherein
each slide mechanism comprises:
a slide-use drive shaft supported to be able to rotate in parallel with the front-back direction of the stacking platform;
a slide-use cam fixed to the slide-use drive shaft;
a slide-use arm abutting against the slide-use cam and converting rotational motion of the slide-use cam to linear motion parallel to the stacking direction; and
a movable member fixed to the slide-use arm and moving together with the slide-use arm in parallel with the stacking direction,
each tilt mechanism comprises:
a tilt-use drive shaft supported to be able to rotate at the movable member in parallel with the front-back direction of the stacking platform;
a tilt-use fixed shaft fixed to the movable member and arranged in parallel with the tilt-use drive shaft;
a tilt-use cam fixed to the tilt-use drive shaft; and
a tilt-use arm with one end side supported to be able to rotate at the tilt-use fixed shaft and with the other end side abutting against the tilt-use cam and converting rotational motion of the tilt-use cam to tilting motion about the tilt-use fixed shaft, and
the clamp rods are fixed to the tilt-use arm.

4. The stack holding apparatus according to claim 3, wherein
the slide-use cam is fixed to the slide-use drive shaft so that when the slide-use arm is positioned at the lower side in the stacking direction, the slide-use arm can be pressed toward the lower side in the stacking direction.

5. The stack holding apparatus according to claim 3, wherein
the slide mechanisms and the tilt mechanisms are respectively arranged at one end side and the other end side of the clamp rods extending in parallel with the front-back direction of the stacking platform, and
the stack holding apparatus further comprises:
a slide-use lever provided at the slide-use drive shaft of either slide mechanism in the slide mechanisms respectively arranged at one end side and the other end side of the clamp rods and making the slide-use drive shaft rotate;
a tilt-use lever provided at the tilt-use drive shaft of either tilt mechanism in the tilt mechanisms respectively arranged at one end side and the other end side of the clamp rods and making the tilt-use drive shaft rotate;
a slide-use connecting rod connecting the slide-use drive shafts of the slide mechanisms respectively arranged at one end side and the other end side of the clamp rods and rotating together with the slide-use drive shafts; and
a tilt-use connecting rod connecting the tilt-use drive shafts of the tilt mechanisms respectively arranged at one end side and the other end side of the clamp rods and rotating together with the tilt-use drive shafts.

6. The stack holding apparatus according to claim 5, wherein
the slide-use lever and the tilt-use lever are respectively provided at one end side of the clamp rod at one clamp rod side in the pair of clamp rods arranged at the two left and right sides of the stacking platform and are respectively provided at the other end side of the clamp rod at the other clamp rod side.

* * * * *